US011317563B2

(12) United States Patent
Fels

(10) Patent No.: US 11,317,563 B2
(45) Date of Patent: May 3, 2022

(54) FEEDER DEVICE FOR A DRAPER HEADER

(71) Applicant: IP Machinery Pty Ltd, Neridup (AU)

(72) Inventor: Michael Fels, Neridup (AU)

(73) Assignee: IP MACHINERY PTY LTD, Neridup (AU)

( * ) Notice: Subject to any disclaimer, the term of this patent is extended or adjusted under 35 U.S.C. 154(b) by 171 days.

(21) Appl. No.: 16/488,766

(22) PCT Filed: Oct. 21, 2017

(86) PCT No.: PCT/AU2017/051153
§ 371 (c)(1),
(2) Date: Aug. 26, 2019

(87) PCT Pub. No.: WO2018/039751
PCT Pub. Date: Mar. 8, 2018

(65) Prior Publication Data
US 2020/0045885 A1 Feb. 13, 2020

(30) Foreign Application Priority Data
Feb. 24, 2017 (AU) ................ 2017900619

(51) Int. Cl.
*A01D 57/12* (2006.01)
*A01D 34/13* (2006.01)
(Continued)

(52) U.S. Cl.
CPC ............ *A01D 57/12* (2013.01); *A01D 34/13* (2013.01); *A01D 47/00* (2013.01); *A01D 41/06* (2013.01);
(Continued)

(58) Field of Classification Search
CPC ........ A01D 57/12; A01D 34/13; A01D 47/00; A01D 41/06; A01D 41/14; A01D 61/002; A01D 61/004; A01D 61/008; B65G 65/22
See application file for complete search history.

(56) References Cited

U.S. PATENT DOCUMENTS 2,612,980 A * 10/1952 Ochler ................ A01D 61/008
198/513
3,224,177 A * 12/1965 Adee ...................... A01D 82/00
56/153
(Continued)

FOREIGN PATENT DOCUMENTS

GB 2200526 A * 8/1988 ............. A01D 41/06

OTHER PUBLICATIONS

International Search Report and Written Opinion dated Mar. 27, 2018 in International Patent Application No. PCT/AU2017/051153 filed Oct. 21, 2017, all pages.
(Continued)

*Primary Examiner* — Arpad Fabian-Kovacs
(74) *Attorney, Agent, or Firm* — Kilpatrick Townsend & Stockton LLP

(57) ABSTRACT

The feeder device located at the centre section of a front of a harvester. The feeder device comprises one or more flights configured for improving operation of the feeder device. The feeder device comprises a shaft including a plurality of flights. They extend substantially along the entire length of the shaft and are arranged in a spaced apart relationship with respect to each other. In this manner, a threaded-like formation defined by the spaced apart arrangement of flights extends substantially along the entire length of the shaft of the feeder device.

43 Claims, 10 Drawing Sheets

(51) Int. Cl.
  *A01D 47/00* (2006.01)
  *A01D 61/00* (2006.01)
  *A01D 41/14* (2006.01)
  *B65G 65/22* (2006.01)
  *A01D 41/06* (2006.01)

(52) U.S. Cl.
  CPC ............ *A01D 41/14* (2013.01); *A01D 61/002* (2013.01); *A01D 61/004* (2013.01); *A01D 61/008* (2013.01); *B65G 65/22* (2013.01)

(56) References Cited

U.S. PATENT DOCUMENTS

| | | | | |
|---|---|---|---|---|
| 3,244,271 A * | 4/1966 | Wenning | ............ | A01D 61/004 198/669 |
| 3,648,710 A | 3/1972 | Rowland-Hill | | |
| 3,945,178 A * | 3/1976 | Delfosse | ............ | A01D 61/008 56/14.6 |
| 3,982,383 A * | 9/1976 | Mott | ............ | A01D 34/30 56/11.6 |
| 4,091,602 A * | 5/1978 | Williams | ............ | A01D 34/30 56/14.4 |
| 4,177,626 A * | 12/1979 | McNaught | ............ | A01D 61/008 198/513 |
| 4,198,803 A * | 4/1980 | Quick | ............ | A01D 34/13 56/296 |
| 4,248,248 A * | 2/1981 | De Busscher | ............ | A01F 12/22 460/68 |
| 4,271,660 A * | 6/1981 | Kloefkorn | ............ | A01D 61/008 198/515 |
| 4,271,956 A * | 6/1981 | Hutchinson | ............ | B65G 65/22 198/613 |
| 4,409,780 A * | 10/1983 | Beougher | ............ | A01B 73/02 172/456 |
| 4,473,993 A * | 10/1984 | Jennings | ............ | A01D 34/28 56/192 |
| 4,487,004 A * | 12/1984 | Kejr | ............ | A01D 41/14 56/14.4 |
| 4,495,756 A * | 1/1985 | Greiner | ............ | A01D 89/002 56/322 |
| 4,903,470 A * | 2/1990 | Hemker | ............ | A01D 41/144 172/311 |
| 4,956,966 A * | 9/1990 | Patterson | ............ | A01D 41/14 56/181 |
| 5,005,343 A * | 4/1991 | Patterson | ............ | A01D 41/14 56/14.4 |
| 5,293,730 A * | 3/1994 | Bich | ............ | A01D 89/002 56/10.2 G |
| 5,557,912 A * | 9/1996 | Voss | ............ | A01D 41/06 56/130 |
| 5,673,543 A * | 10/1997 | Richardson | ............ | A01D 41/144 56/228 |
| 5,850,883 A * | 12/1998 | Schwartz | ............ | C05F 17/943 172/122 |
| 6,070,401 A * | 6/2000 | Johnson | ............ | A01D 41/14 56/158 |
| 6,350,197 B1 | 2/2002 | Cooksey et al. | | |
| 6,640,527 B2 * | 11/2003 | Farley | ............ | A01D 61/008 56/12.4 |
| 6,865,871 B2 * | 3/2005 | Patterson | ............ | A01D 57/20 56/14.5 |
| 7,520,117 B2 * | 4/2009 | Rieck | ............ | A01D 45/021 56/62 |
| 7,658,059 B2 * | 2/2010 | Majkrzak | ............ | A01D 34/38 56/264 |
| 7,866,136 B1 * | 1/2011 | Hill | ............ | A01D 57/20 56/364 |
| 8,635,842 B2 * | 1/2014 | Markt | ............ | A01D 41/14 56/15.2 |
| 9,198,353 B2 * | 12/2015 | Ritter | ............ | A01D 45/021 |
| 9,198,355 B2 * | 12/2015 | Heim | ............ | A01D 61/004 |
| 9,392,747 B2 * | 7/2016 | Patterson | ............ | A01D 61/008 |
| 9,516,816 B2 * | 12/2016 | Allochis | ............ | A01D 34/14 |
| 9,578,806 B2 * | 2/2017 | Weeks | ............ | A01D 61/008 |
| 10,448,572 B2 * | 10/2019 | Sorensen | ............ | A01D 61/004 |
| 2003/0110750 A1 * | 6/2003 | Farley | ............ | A01D 61/008 56/12.4 |
| 2008/0022646 A1 * | 1/2008 | Patterson | ............ | A01D 41/14 56/14.4 |
| 2008/0161077 A1 * | 7/2008 | Honey | ............ | A01D 41/16 460/106 |
| 2009/0217639 A1 * | 9/2009 | Lohrentz | ............ | A01D 61/004 56/364 |
| 2009/0277146 A1 * | 11/2009 | Sauerwein | ............ | A01D 34/13 56/208 |
| 2016/0295800 A1 * | 10/2016 | Allochis | ............ | A01D 61/002 |
| 2016/0324071 A1 | 11/2016 | Wenger et al. | | |
| 2019/0000013 A1 * | 1/2019 | Sorensen | ............ | A01D 61/004 |
| 2019/0200525 A1 * | 7/2019 | MacMillan | ............ | A01D 61/006 |
| 2019/0313581 A1 * | 10/2019 | Sorensen | ............ | A01D 61/008 |

OTHER PUBLICATIONS

Product information guide, Case IH, Axial Flow 2013, 2 pages. Retrieved from https://web.archive.org/web/*/http://titanoutletstore.com/wp/wp-content/uploads/Header-Compatibility-2013-update.pdf Accessed via Wayback Machine for Sep. 10, 2016.
(2152)—Draper Header (9/06-11/11) Vendor: Case IH Section: (03)—Chassis/Mounted Equipment Diagram: (09-54)—Adapter Auger and Components, 2 pages. Retrieved from https://www.messicks.com/cas/58904?sectionID=63103&diagramId=58904-482945 Accessed on Nov. 8, 2021.
Notification of material filed by a third party for Australian Patent No. 2017101797, Patentee Name: Mygrain Solutions Pty Ltd, dated May 31, 2018, making a submission under s27/28: Statutory Declaration of Laurie Colin Phillips made on Mar. 7, 2018, 68 pages.
Responses to an Examiner's Reports, dated Sep. 21, 2018, Aug. 29, 2018 and Jul. 23, 2018, for Australian Patent No. 2017101797, Patentee Name: Mygrain Solutions Pty Ltd, 9 pages.

\* cited by examiner

| Label | Description of Dimension | Comments | Type of Harvester Front ||||
|---|---|---|---|---|---|---|
| | | | McDon D60/D65 | McDon Older Models | Honeybee | Case New Holland |
| F | Spacing between outer flights | F=(Combine Feeder House Width) - 100mm | 1000 | 1000 | 1000 | 1000 |
| A | Drum length | (Depends on Front Make/Model) | 1675 | 1560 | 1825 | 1984 |
| E | Overall Diameter | (Depends on Front Make/Model) | 560 | 560 | 560 | 650 |
| B | Length of outer flights | B=(A-F)/2 | 337.5 | 280 | 412.5 | 492 |
| D | Gap between paddle flights | To suit 1100mm width feeder house | 280 | 280 | 280 | 280 |
| C | Spacing between Opposing Outer Flights and Paddle flights | To suit 1100mm width feeder house | 640 | 640 | 640 | 640 |
| G | Spacing between non Opposing Outer Flights and Paddle flights | To suit 1100mm width feeder house | 360 | 360 | 360 | 360 |
| Drum ø | (Overall Diameter - 2*flight Depth) | (Depends on Front Make/Model) | 300 | 300 | 300 | 390 |
| Ratio | (overall diameter including flighting)/(diameter of drum) | (Depends on Front Make/Model) | 1.87 | 1.87 | 1.87 | 1.67 |

Figure 8

FEEDER DEVICE FOR A DRAPER HEADER

CROSS REFERENCE TO RELATED APPLICATIONS

The entire disclosure of Australian Provisional patent application 2017900619 is incorporated herein by reference.

TECHNICAL FIELD

The present invention relates to material handling apparatus, in particular to an apparatus for conveying a material produced during a harvesting operation into a harvester for processing of the material produced during the harvesting operation.

The invention has been devised particularly, although not necessarily solely, in relation to a crop gathering attachment for a harvester having a rotatable auger conveyor such as a crop consolidating auger conveyor.

BACKGROUND ART

The following discussion of the background art is intended to facilitate an understanding of the present invention only. The discussion is not an acknowledgement or admission that any of the material referred to is or was part of the common general knowledge as at the priority date of the application.

Agricultural harvesting machines comprise harvester fronts (also referred to as 'headers', 'draper fronts', 'auger fronts' or simply 'Front') for collecting the crop material during the harvesting process. The crop material includes grain and crop material residue such as straw requiring separation. After the separation process, the grain is stored in a grain tank and any crop material residue such as straw is typically returned to the ground through the rear of the harvester.

Two commonly used types of header fronts are draper fronts (shown in FIG. 1) and auger fronts.

Typically, auger fronts include: (1) a cutting bar for cutting the crop material, (2) a platform to receive the crop material cut by the cutting bar, the platform having the cutting bar attached thereto and a rear opening (referred to from now on as feeder house opening) for delivery of the harvested crop material into the harvester for separation thereof, (3) a reel including a bat or finger assembly for picking up the cut crop material and letting the crop material fall onto the auger during rotation of the reel, (4) an auger for conveying the crop material towards the center of the platform which incorporates a feeder drum adjacent the feeder house opening for delivery of the harvested crop material into the harvester during rotation of the feeder drum.

In contrast, draper fronts comprise "draper mats" which are effectively conveyor belts which travel perpendicular to the motion of the harvester which deliver the cut crop material from the cutter bar to the centre of the Front. The auger visible in FIG. 1 is an optional attachment referred to as a "cross auger" for draper fronts which assists the movement of crop material in bulky crops like canola. Many draper fronts however exist without this cross auger attachment.

Typically, draper fronts include: (1) a cutting bar for cutting the crop material, (2) a platform to receive the crop material cut by the cutting bar, the platform having the cutting bar attached thereto and a feeder house opening for delivery of the harvested crop material into the harvester for processing thereof, (3) side draper mats for conveying the crop material towards the center of the platform, (4) a reel including a bat or finger assembly for picking up the cut crop material and letting the crop material fall onto the draper mats during rotation of the reel, (5) a centre draper mat running parallel to the motion of the harvester, or smooth surface located at or near the centre of the platform for receiving the crop material from the side draper mats and conveying it rearwards, and (6) a feeder drum located directly behind and in line with the centre mat or smooth surface for receiving the crop material and adjacent the feeder house opening for delivery of the harvested crop material into the harvester during rotation of the feeder drum.

FIG. 1 shows a harvester 10 having attached to its front section a header front (also referred herein as Front) for cutting and delivering the crop material to the threshing drum of the harvester 10. The Front shown in FIG. 1 is a draper front due to incorporating side conveyors for conveying the crop material to the centre of the header front.

As shown in FIG. 1, Fronts are located at the front of a harvester. Fronts, during operation of the harvester, cut the crop material and deliver the crop material to the threshing drum for separating the crop material residue from the grain. Delivery of the harvested crop material is done through a conveyor that moves the crop material from the Front to the threshing drum; for this, the front comprises an opening (referred to as the feeder house opening) in communication with the conveyor to allow the crop material to be moved from the front into a conveyor for delivery to the threshing drum; typically, the feeder house opening is located at or near to the centre location of the front. As mentioned before, a feeder house opening typically located at a centre location of the platform permits the crop material to be moved from the platform into the conveyor for delivery of the crop material to the threshing drum. The fact that the feeder house opening is located at or near a centre location requires movement of the crop material towards the centre of the platform; movement of the crop material to the centre is accomplished via the auger or draper mats that during rotation thereof, move the crop material from the outer sections of the platform to the centre section of the platform for movement through the feeder house opening of the platform.

Movement of the crop material through the feeder house opening is facilitated by a feeder drum which consolidates the crop material and transports it in a rearwards direction through the feeder house opening. This particular feeder drum (also referred to as crop material consolidating auger conveyor) during rotation thereof causes the crop material to move into the feeder house opening for delivery to the threshing drum. Rotation of the auger or the draper mats (as applicable) conveys the crop material towards the center of the platform and in particular into the feeder drum.

Feeder drums of conventional harvester fronts are adapted to consolidate the crop material at the central region of the front and to convey the crop material through the feeder house opening for processing. Typically, feeder drums include a retractable fingers assembly that aid in the process of moving the crop material through the opening; cyclical extension and retraction of the fingers occurs via a crankshaft adapted to adjust the timing of the finger retraction during rotation of the feeder drum. In conventional feeder drums the fingers are located in the center area of the feeder drum. Also, conventional feeder drums include helical flanges (referred to also as flights) at each end of the ends of the conventional drum.

Conventional feeder drums are defined by a drum having: a centre section and helical flanges defining an auger structure at each end of the drum.

The centre section includes exclusively a plurality of retractable fingers arranged in a spaced apart relationship with respect to each other defining rows of fingers; the rows of fingers surround exclusively the center section of the tube of the feeder drum, The helical flanges are attached at each end of the tube of the feeder drum; these helical flanges fully surround exclusively the ends of the drum and extend inward from the outer edges of the drum to a specific distance to leave the centre section free of helical flanges. The centre section of the drum comprises openings for permitting the fingers to be selectively displaced between the retracted condition (when the fingers are located within the drum) and an extended condition (when the fingers are located exterior to the drum).

Conventional drums typically comprise a relative large quantity of flighting arranged relative close to each other on both sides of the drum. This particular arrangement of closely packed flights defines a "smooth" surface that fails to "grab" the crop material and pull the crop material through the feeder house opening.

Further, conventional feeder drums include several other drawbacks:

One of these drawbacks is blocking and jamming of the crop material at the feeder drum impeding delivery of the crop material to the threshing drum—this is particularly true when harvesting crops that have a high bulk of volume in relation to their weight, such as canola, lupins, peas and beans.

Another drawback is related to the retractable fingers that are selectively displaced between a contracted condition and an extended condition with respect to the drum. Conventional drums either (1) offer no adjustment of the finger timing, or (2) the adjustment is only possible within a narrow rotational range with a number of finite positions available. This drawback makes it difficult or even impossible for the operator to adjust the finger timing. Not properly timing the fingers may result in the crop material to undergo "repeating" to be will explained below.

Conventional drums suffer from a process referred to as "repeating" of crop material. This "repeating" process is typically caused by crop material that rests on the floor located under the conventional feeder drums. The crop material builds up on the floor during the harvesting process forming a stack of crop material that rests on the floor in a substantially stationary condition The cause that the repeating process occurs is that at the location below the centre of the feeder drum, the crop material that rests on the floor under the feeder drum solely relies on the retractable fingers to be engaged and moved tangentially to deliver the crop material into the feeder house opening.

Further, the retractable fingers transport the crop material by engaging long pieces of intertwined crop material to which the grain is typically attached; however, under specific conditions, partly processed grain and other fine crop material (typically referred to as "thrashed") may buildup on the floor under the feeder drum, which the fingers, by nature of their intermittent placement, are unable to push; this creates a high friction "dead zone" of stationary material on the floor under the drum.

This buildup of crop material impedes the required tangential flow of crop material under the feeder drum resulting in that the crop material rotates in a radial motion around the drum instead than the required tangential flow to deliver the crop material through the feeder house opening and creating a snowballing effect of crop material "repeating" around the feeder drum.

The "repeating" of crop material typically generates a large blockage of crop material under the feeder drum that can damage the harvester machine; thus, once repeating starts, the harvester has to be stopped for clearing purposes by reversing the harvester and potentially manual clearing by an operator.

Further, currently, the repeating process is mitigated using two solutions: firstly by extending the outer flighting further into the centre section of the drum, thereby concentrating the crop material into a thicker band, which is then relied upon to interact with the thrashed material and carry it rearwards into the feeder house; and secondly by retarding the timing of the retractable fingers so that they are in a more extended position when at the bottom of their rotation cycle.

However, both of these solutions have drawbacks that contribute to poor functioning associated with conventional Fronts, as follows:

firstly, extending the flighting further inwards concentrates the crop material into a narrow band in the centre of the drum, which in bulky crops has difficulty in fitting through the gap formed between the feeder drum and the floor in which the crop material rests; this overloads the centre of the feeder house mechanism and the threshing drum located within the harvester, thereby increasing the strain in the centre of the machine whilst not utilising its full capacity; and secondly, retarding the retractable fingers under specific conditions can in fact exacerbate the "repeating" process described earlier, by retaining its grip on crop material for too long thereby resulting in the crop material being carried around the drum and creating a "repeating" scenario.

Furthermore, other drawbacks of conventional feeder drums are that they are not aggressive enough resulting in blockages and reduced capacity in "bushy" crops that have a high bulk volume in relation to their weight, such as canola or lupins. For example, as mentioned before, conventional feeder drums have excessive and closely packed flighting on both sides of the drum defining "smooth" surfaces that fail to "grab" the crop material for delivery into the harvester.

Further, the retractable fingers are typically arranged in a spiral or screw pattern, which can act as an auger which shifts the crop material sideways, rather than as a pulling action dragging the crop material under the drum. There are also typically a relative small number of fingers in the conventional feeder drums.

Also, traditional feeder drums have a large diameter drum with relatively short flighting, which results in that the fingers extend a relative small distance beyond the outer surface of the drum of the feeder drum, thereby having a less aggressive grabbing action. It also means that the gap under the drum has less depth, which impedes the flow of bulky crops through the gap between the feeder drum and the floor on which the crop material rests.

Moreover, conventional flighting on feeder drums is typically attached at one end to the outer end of the drum, from where it extends inwards in a rotating screw fashion towards the centre of the drum, creating an augering effect which moves crop material sideways towards the centre.

Fatigue caused by frequent jamming of crop material and the resultant shock load created by uneven flow of crop material through the feeder drum will damage the feeder drum and its parts; for example, the crankshaft moving the retractable fingers assembly that aid in the process of moving the crop material through the feeder house opening may be severely damaged; typically, this type of damage requires removal of the feeder drum and crankshaft to replace, for example, the retractable finger supports that permit the retractable movement of the fingers.

Further, conventional feeder drums may include internal reverse clutches that get jammed in reverse position and on many occasions these clutches fall apart. Repair of the damaged clutches is relatively expensive and time consuming to repair. Also, incorrect installation of the clutches may lead to fires.

Furthermore, cracking of end plates and bending stub shafts of the feeder drum due to lump feeding and regular reversing is common in conventional feeder drums. Also, excess blockages due to jamming of crop material at the feeder drum wears out the slip clutch in the adaptor drive. And, the uneven flow of crop material through the combine harvester as a result of these deficiencies often leads to blocking of and potential damage to the combine harvester itself.

Moreover, the deficiencies of conventional feeder drums mentioned above, typically can slow down the harvesting speed to less than half the full capacity of the Fronts; this is particularly true in relative bulky crops such as canola.

It is against this background that the present invention has been developed.

SUMMARY OF INVENTION

According to a broad aspect of the invention there is provided a feeder device for attachment to a harvester front for cutting of crop material, the front being attached to a harvester comprising a feeder house opening, the feeder device comprising a shaft having a first end, a second end and a centre section located between the first and second end, the centre section comprising paddle means for engaging and moving crop material resting below the feeder device into the feeder house opening.

Preferably, the paddle means comprise paddle flights that wrap less than a full turn around the shaft.

Preferably, the paddle flight comprises a leading edge and a trailing edge having a height equal to the flight depth of the paddle flight, and the leading edge having a height that decreases from a height equal to the flight depth to zero as the paddle flight extends radially around the shaft of the feeder device defining a curved edge.

According to another broad aspect of the invention there is provided a feeder device for attachment to a harvester front for cutting of crop material, the front being attached to a harvester comprising a feeder house opening, the feeder device comprising a shaft having a first end, a second end and a centre section located between the first and second end, the first and second ends comprising first and second conveyor means, each conveyor means extending a particular distance from the ends of the shaft to a particular location of the shaft to direct the crop material into the feeder house opening.

Preferably, the conveyor means comprise flights that extend the particular distance from the ends of the shaft to a particular location of the shaft to direct the crop material into the feeder house opening.

Preferably, each flight wraps less than a full turn around the shaft.

Preferably, the centre section of the shaft comprises paddle means.

Preferably, the paddle means comprise paddle flights that wrap less than a full turn around the shaft.

Preferably, the paddle flights wrap ⅓ or less of a full turn around the shaft.

According to a further broad aspect of the invention there is provided a feeder device for attachment to a harvester front for cutting of crop material, the front being attached to a harvester comprising a feeder house opening, the feeder device comprising a shaft having a first end, a second end and a centre section located between the first and second end, the first and second ends comprising first flights, each flight having a pitch that is greater than the distance between the ends of the shaft and the centre section of the shaft.

Preferably, each flight comprises one or more crests.

According to a further broad aspect of the invention there is provided a feeder device for attachment to a harvester front for cutting of crop material, the front being attached to a harvester comprising a feeder house opening, the feeder device comprising a shaft having a particular diameter and comprising flights wrapping less than a full turn around the shaft, the flights having a particular flight depth, wherein the ratio between the particular diameter and particular flight depth is around 2.3 to 3.

Preferably, the feeder device further comprises a plurality of retractable fingers having a particular effective length to effectively engage and move crop material located under the feeder device.

According to a further broad aspect of the invention there is provided a feeder device for attachment to a harvester front for cutting of crop material, the front being attached to a harvester comprising a feeder house opening, the feeder device comprising a shaft having a first end, a second end and a centre section located between the first and second end, the first and second ends comprising flights wrapping less than one turn around the shaft, configured to an imaginary helix extending from the first end to the second of the shaft, wherein the pitch of the imaginary helix is such that the force applied to crop material being conveyed by the flights has a component that is tangential to the rotation of the flighting for the crop material being conveyed by the flighting from the ends of the shaft to the centre section of the shaft; wherein the component that is parallel is equal or greater than the perpendicular component of the force.

Preferably, the imaginary helix has a pitch of about double the diameter of the shaft.

Preferably, each flight having a curved proximal end attached to an end of the shaft and a distal end defining a straight edge extending substantially perpendicular from the outer surface of the shaft, wherein the distance between the distal edges of the flights is the substantially the same or less than the width of the feeder house opening.

Preferably, distance between the distal edges of the flights is the substantially the same or less than the width of the feeder house opening is about 100 mm.

According to a first aspect of the invention there is provided a feeder device for use in a harvester front for cutting and collecting crop material, the front including a rear opening arranged such that cut crop material is transferred therethrough into a feeder house opening of the harvester, the feeder device comprising:

a shaft which is mountable in the harvester front so as to be rotatable about a central axis thereof and has opposed end sections and a centre section located between the end sections, the shaft being dimensioned such that the centre section is arranged in front of said feeder house opening when the shaft is mounted; and one or more paddles projecting from the centre section and diagonally to the central axis so as to urge crop material lying below the centre section towards said opening as the shaft rotates.

Preferably, the or each paddle is shaped to conform to an imaginary helix extending around the shaft from one of the end sections to the other.

Preferably, the feeder device further comprising plural said paddles arranged at spaced positions on the shaft.

Preferably, the paddles are arranged to either side of a plane which is perpendicular to said axis and, when the shaft is mounted, passes substantially centrally through said feeder house opening, such that surfaces of the paddles which are arranged to contact the crop material lying below the centre section, so as to urge it towards said opening, face in directions which intersect with said plane.

Preferably, wherein the paddle(s) to one side of the plane and the paddle(s) to the other side of the plane respectively conform to imaginary helices extending around the shaft from the one of the end sections to the other in opposite rotational directions.

Preferably, the or each paddle is shaped such that the imaginary helix to which it conforms has a pitch of between three times the diameters of the shaft.

Preferably, the or each paddle is shaped such that the pitch is between one times the diameters.

Preferably, the or each paddle is shaped such that the pitch is about 600 mm.

Preferably, the paddles are angularly offset around the shaft.

Preferably, an offset angle of the paddles is 360 degrees divided by the number of paddles, whereby the angular offset of the paddles is regular.

Preferably, the number of paddles is two.

Preferably, the or each paddle wraps up to one half of a turn around the shaft.

Preferably, the or each paddle wraps up to one third of a turn around the shaft.

Preferably, the or each paddle wraps up to one quarter of a turn around the shaft.

Preferably, the or each paddle wraps about one quarter of a turn around the shaft.

Preferably, the end sections each have a length between a quarter and a half of a length of the centre section.

Preferably, the feeder device further comprises flighting on the end sections to direct crop material received into the harvester front laterally inwardly towards a position below the centre section as the shaft rotates, such that the paddle(s) urge that material towards said opening.

Preferably, the flighting on each end section conforms to a respective one of imaginary helices extending around the shaft from one of the end sections to the other in opposite rotational directions.

Preferably, the flighting on each end section wraps up to one turn around the shaft.

Preferably, the flighting on each end section wraps up to half a turn around the shaft.

Preferably, the flighting on each end section wraps about half a turn around the shaft.

Preferably, the flighting on each end section extends substantially throughout the entire length of that end section.

Preferably, the flighting on one end section is offset from the flighting on the other end section by half a turn around the shaft.

Preferably, the or each paddle has a leading edge which extends from a respective position on a surface of the shaft and is inclined with respect to a surface at that position, whereby a degree of engagement between the paddle and material lying below the centre section increases progressively as the shaft rotates whereby the material is urged towards said opening.

Preferably, the leading edge of the or each paddle is convex.

Preferably, the leading edge of the or each paddle has a radius of curvature, about a position on the shaft from which a trailing edge of the paddle extends, which is between half of a maximum dimension the paddle in a direction radially outward from the shaft ("depth") and about 190 mm or more.

Preferably, the radius of curvature of the or each paddle is between three quarters of the depth of the paddle and all of the depth of the paddle.

Preferably, the radius of curvature of the or each paddle is about 85% of the depth of the paddle.

Preferably, the or each paddle has a radially outer edge arranged to follow the leading edge of the paddle.

Preferably, the radially outer edge is substantially concentric with a circumferential surface of the shaft.

Preferably, the radially outer edge of the or each paddle defines the depth of the paddle.

Preferably, the or each paddle has a maximum dimension in a direction radially outward from the shaft ("depth") which is at least one third of a diameter of the shaft.

Preferably, the or each paddle is configured in the form of a fin.

Preferably, the or each paddle has a trailing edge which extends from a position on the shaft so as to be perpendicular to a surface of the shaft at that position.

According to a second aspect of the invention there is provided a feeder device for use in a harvester front for cutting and collecting crop material, the front including a rear opening arranged such that cut crop material is transferred therethrough into a feeder house opening of the harvester, the feeder device comprising:

a shaft which is mountable in the harvester front so as to be rotatable about a central axis thereof and has opposed end sections and a centre section located between the end sections, the shaft being dimensioned such that the centre section is arranged in front of said feeder house opening when the shaft is mounted;

one or more rows of fingers mounted to the shaft, the or each row extending substantially parallel to the axis; and at least one mechanism which is configured to reciprocate the fingers, as the shaft rotates, such that the fingers in the or each row assume an extended condition during downward movement of the row, so as to penetrate crop material received into the harvester front and urge that material under the shaft, and assume a retracted condition during rearward movement of the row, so as to separate from that material.

Preferably, the feeder device comprises plural said rows arranged at spaced positions around the shaft.

Preferably, said positions are equally spaced.

Preferably, the fingers in each row are laterally offset from the fingers in the or each row adjacent to it.

Preferably, said at least one mechanism comprises a crankshaft arranged within the shaft and connecting members interconnecting the crankshaft and fingers such that the fingers reciprocate as the shaft rotates.

Preferably, the spacing of the fingers in the or each row is such that there are between 12 and 30 fingers per metre in a direction parallel to said axis.

Preferably, the or each row has a length of between 0.8 metres and 2 metres.

Preferably, the fingers are disposed over the centre section.

Preferably, the fingers are disposed over the centre section and the end sections.

Preferably, the feeder device according to the first aspect of the invention.

Preferably, the feeder device being accordant with the feeder device according to the first aspect of the invention, wherein the flighting intersects at least one said row.

Preferably, at least one said paddle intersects at least one said row.

Preferably, the or each paddle intersects at least one said row.

According to a third aspect of the invention there is provided a feeder device for use in a harvester front for cutting and collecting crop material, the front including a rear opening arranged such that cut crop material is transferred therethrough into a feeder house opening of the harvester, the feeder device comprising:
a shaft which is mountable in the harvester front so as to be rotatable about a central axis thereof and has opposed end sections and a centre section located between the end sections, the shaft being dimensioned such that the centre section is arranged in front of said feeder house opening when the shaft is mounted; and
ingers mounted at distributed positions along and around the shaft,
a mechanism which is configured to reciprocate the fingers, as the shaft rotates, such that each finger assumes an extended condition during downward movement thereof, so as to penetrate crop material received into the harvester front and urge that material under the shaft, and assumes a retracted condition during rearward movement thereof, so as to separate from that material, the fingers being dimensioned such that each projects from the shaft a distance equal to at least a third of a diameter of the shaft when in its extended condition.

Preferably, the feeder device comprises a feeder device in accordance with the first or second aspect of the invention.

According to a fourth aspect of the invention there is provided a feeder device for use in a harvester front for cutting and collecting crop material, the front including a rear opening arranged such that cut crop material is transferred therethrough into a feeder house opening of the harvester, the feeder device comprising:
  a shaft which is mountable in the harvester front so as to be rotatable about a central axis thereof and has opposed end sections and a centre section located between the end sections, the shaft being dimensioned such that the centre section is arranged in front of said feeder house opening when the shaft is mounted; and
  flighting on the end sections to direct crop material received into the harvester front laterally inwardly towards a position below the centre section for receipt through said opening, wherein
  the ratio between the diameter of the shaft and the flight depth is about 2.3 to 3.

Preferably, the feeder device comprises a feeder device in accordance with the first, second or third aspect of the invention.

Preferably, the centre section has a length approximately equal to a width of the feeder house opening.

Preferably, the shaft is hollow.

Preferably, the shaft is defined by a barrel.

Preferably, a feeder device is a feeder device in accordance with the first, second or third aspect of the invention.

Preferably, the harvester front being operable such that the feeder device rotates at between 120 rpm and 250 rpm.

Preferably, the harvester front being operable such that the feeder device rotates at between 125 rpm and 175 rpm.

Preferably, the harvester front being operable such that the feeder device rotates at about 160 rpm.

Preferably, the harvester front comprises conveyors configured to travel laterally inwardly to carry crop material received into said front laterally inwardly for receipt under said shaft.

Preferably, the harvester front comprises a central conveyor configured to travel rearwardly to carry crop material under said shaft.

According to a fifth aspect of the invention there is provided a harvester comprising a harvester front in accordance with the fourth aspect of the invention.

According to a sixth aspect of the invention there is provided a feeder device for attachment to a harvester front for cutting of crop material, the front being attached to a harvester comprising a feeder house opening, the feeder device comprising a shaft having a first end, a second end and a centre section located between the first and second end, the center section being located forefront of the feeder house opening for delivery therethrough of the crop material for separation within the harvester, wherein the shaft comprises a plurality of flights wrapped at least partially around the shaft from the first end to the second end of the shaft, the flights being arranged in a spaced apart relationship with respect to each other.

Preferably, the plurality of flights comprise a plurality of first flights and a plurality of second flights, the second flights being located between the first flights.

Preferable, a first flight wrap less than a full turn around the first end of the shaft, and another first flight wrap less than a full turn around the second end of the shaft.

Preferably, each first flight comprise a proximal end attached to one of the ends of the shaft, and a distal at a location spaced apart from the end of the shaft.

Preferably, each proximal end comprises a curved edge.

Preferably, each distal end defines a straight edge that extends perpendicularly from the outer surface of the shaft.

Preferably, the first flights are adapted to direct the crop material into the feeder house opening.

Preferably, the first flights are adapted to direct the crop material towards a location of the feeder house opening that is adjacent to the edges of the feeder house opening.

Preferably, the distance between the distal ends of the first flights is less than the width of the feeder house opening to convey the crop material towards the feeder house opening to direct the crop material into the feeder house opening.

Preferably, the distance between the distal ends of the first flights is less than the width of the feeder house opening minus 100 mm.

Preferably, the distal end of each first flights are adjacent an edge of the feeder house opening.

Preferably, the first flights wrap less than a full turn around the shaft.

Preferably, the first flights wrap about ½ of a full turn around the shaft.

Preferably, each first flight extends a particular distance (B) inwards from the outer ends of the shaft.

Preferably, the numerical value of the particular distance (B) that the first flights extend inward from the outer ends of the shaft of the feeder device is dependent on the particular harvester with which the feeder device will be operating.

Preferably, the particular distance (B) that the first flights extends inwards from the outer ends of the shaft of the feeder device is half the difference between the shaft length (A) and the distance (F) between the distal ends of the first flights.

Preferably, the distance (F) between the distal ends of the first flights is about 100 mm less than the width of the feeder house opening of the particular harvester with which the feeder device will be operating.

In a particular arrangement, when the front is fitted to a range of commonly available harvester models, the harvester feeder house opening width is about 1100 mm, resulting in the distance (F) between the distal ends of the first flights to be about 1000 mm.

In a particular arrangement, each first flight extends a distance (B) about between 300 mm to 500 mm inwards from the outer ends of the shaft.

In particular, the distance (B) for feeder devices to be installed on McDon D60/D65, McDon Older models, Honeybee and Case new Holland is, respectively, about 337.5 mm, 280 mm, 412.50 mm and 492 mm.

In particular, the distance (F) between the distal ends of the first flights for the feeder devices to be installed on McDon D60/D65, McDon Older models, Honeybee and Case new Holland is about 1000 mm.

In particular, the drum length (A) for feeder devices to be installed on McDon D60/D65, McDon Older models, Honeybee and Case New Holland is, respectively, about 1675 mm, 1560 mm, 1825 mm and 1984 mm.

Preferably, the flight depth of each first flight is 130 mm.

Preferably, the plurality of first flights comprise a first flight having a right hand thread wrapping less than a full turn around the first end of the shaft, and a first flight having a left hand thread wrapping less than a full turn around the second end.

Preferably, first flight having a right hand thread is located at the left hand end of the feeder device (the first end) when viewing the rear of the feeder device, and the first flight having a left hand thread is located at the right hand end (the second end) when viewing the rear of the feeder device.

Preferably, the plurality of second flights comprise a plurality of paddle flights spaced apart with respect to each other along the centre section of the shaft.

Preferably, the paddle flights wrap less than a full turn around the shaft.

Preferably, the paddle flights wrap about ⅓ of a full turn around the shaft.

Preferably, the plurality of paddle flights comprise a paddle flight having a right hand thread wrapping around the centre section and a paddle flight having a left hand thread wrapping around the centre section.

Preferably, the first flight having a right hand thread and the paddle flight having a right hand thread are next to each other, and the first flight having a left hand thread and the paddle flight having a left hand thread are next to each other.

Preferably, for a feeder device to be operated in conjunction with a harvesters comprising a feeder house opening having a width of 1100 mm, the distal ends of the paddle flight having the right hand thread and of the paddle flight having a left hand thread are spaced apart a distance (D) of about 280 mm.

Preferably, the trailing edge of the paddle flight having a right hand thread and the paddle flight having a left hand thread are offset an azimuth angle φ around the longitudinal axis of the shaft.

Preferably, the azimuth angle φ is about 180°.

Preferably, for a feeder device to be operated in conjunction with a harvester with a feeder house opening having a width of 1100 mm, the distance (C) between the distal ends of the first flight having a right hand thread and of the paddle flight having a left hand thread is about 640 mm.

Preferably, for a feeder device to be operated in conjunction with a harvester with a feeder house opening having a width of 1100 mm, the distance (C) between the distal ends of the first flight having a left hand thread and of the paddle flight having a right hand thread is about 640 mm.

Preferably, for a feeder device to be operated in conjunction with a harvester with a feeder house opening having a width of 1100 mm, the distance (G) between the distal end of the first flight having a right hand thread and of the paddle flight having a right hand thread is about 360 mm.

Preferably, for a feeder device to be operated in conjunction with a harvester with a feeder house opening having a width of 1100 mm, the distance (G) between the distal end of the first flight having a left hand thread and the paddle flight having a left hand thread is about 360 mm.

Preferably, the feeder device comprises an overall diameter equal to the diameter of the shaft plus the flight depth of the flights attached to the shaft and extending therefrom.

Preferably, the ratio between the overall diameter of the feeder device and the flight depth is about between 1.60 to 1.80

In one arrangement, the diameter of the shaft is about 300 mm and the flight depth of the flights is about 130 mm.

In another arrangement, the diameter of the shaft is about 390 mm and the flight dept is about 130 mm.

Preferably, the feeder device comprises one or more rows of retractable fingers, the rows being arranged in a spaced apart relationship with respect to each other and surrounding the shaft.

Preferably, neighboring fingers in each row are spaced apart 200 mm.

In a particular arrangement, the fingers of each row extend along a particular section of the shaft.

Preferably, the particular section including the fingers of one row spread along the shaft of the feeder device a particular width being proportional to the width of the feeder house.

Preferably, the particular width is about equal or slightly larger than the distance F between the distal ends of the first flights.

Preferably, the number of fingers per unit length in the particular section including the fingers is the same no matter the type of feeder house is being used.

In a particular arrangement, there are 25 fingers extending along the particular section of the shaft, the particular section of the shaft having a length of about 1.25 to 2 meters.

In a particular arrangement, the neighboring fingers in each row are spaced apart about 200 mm.

Preferably, each row comprises a plurality of fingers that are arranged in a spaced apart relationship with respect to each other and extend from one end to the other end of the shaft.

Preferably, the rows of fingers extend along a particular section of the shaft, the particular section extending between the first flights.

In a particular arrangement, each row extend from the first end of the shaft to the second end of the shaft.

Preferably, the rows are arranged to define straight lines running parallel to the longitudinal axis of the shaft.

Preferably, the rows of fingers are intersected by the flights.

Preferably, there are about 12 to 30 fingers/m of shaft.

In a particular arrangement, there are four linear rows of fingers.

Preferably, neighbouring rows of fingers are spaced apart from each other at a particular azimuth angle φ around the shaft.

Preferably, the particular azimuth angle φ is about 90°.

Preferably, the fingers of neighboring rows are offset with respect to each other.

Preferably, the feeder device comprises a coarser pitch of flighting and minimises the length that flighting is attached to the shaft, whilst maximising the overall length of the shaft with retractable fingers, meaning that the retractable fingers are more capable to move the crop material for delivery through the feeder house opening.

Preferably, the feeder drum comprises a smaller shaft diameter and taller flighting and greater finger extension when compared with conventional feeder devices. This is particularly advantageous because it results in the retractable fingers penetrating further into the crop material thereby more successfully moving the crop material for delivery to the feeder house. A second benefit of this is that there is a taller gap between the shaft and the floor under the feeder device, thereby allowing more bulk of crop material to flow unimpeded through to the feeder house opening.

According to a seventh aspect of the invention there is provided a paddle flight having a flight configured to wrap less than a full turn around a shaft of a feeder device for attachment to a harvester front for cutting of crop material and for attachment to a harvester comprising a feeder house opening, the feeder device comprising a shaft having a first end, a second end and a centre section located between the first and second end, the center section being located forefront of the feeder house opening for delivery therethrough of the crop material for separation within the harvester, wherein the paddle flight comprises a leading edge and a trailing edge having a height equal to the flight depth of the paddle flight, and the leading edge having a height that decreases from a height equal to the flight depth to zero as the paddle flight extends radially around the shaft of the feeder device defining a curved edge, wherein the paddle flight is configured to wrap less than a full turn around the shaft.

Preferably, the paddle flight is adapted to wrap around the shaft about ⅓ of a full turn around the shaft.

Preferably, the curved edge has a particular curvature radius being about 85% of the flight depth.

Preferably, the flight depth is 130 mm and the curvature radius is about 110 mm.

Preferably, the trailing edge defines a straight edge extending perpendicularly to the outer surface of the shaft when the paddle flight is attached to the shaft of the feeder device.

According to an eighth aspect of the invention there is provided a feeder device for attachment to a harvester front for cutting of crop material, the front being attached to a harvester comprising a feeder house opening, the feeder device comprising a shaft having a first end, a second end and a centre section located between the first and second end, the center section being located forefront of the feeder house opening for delivery therethrough of the crop material for separation within the harvester, wherein the shaft comprises a plurality of paddle flights in accordance with the second seventh of the invention arranged in a spaced apart relationship with respect to each other, Preferably, the plurality of paddle flights wrap around the centre section of the shaft less than a full turn around the shaft.

Preferably, the plurality of paddle flights partially wrap about ⅓ of a full wrap around the shaft.

Preferably, the plurality of paddle flights comprise a paddle flight having right hand thread wrapping around the centre section in a clockwise direction, and a paddle flight having a left hand thread wrapping around the centre section in a counter-clockwise direction.

Preferably, for a feeder device to be operated on a front attached to a harvester with a feeder house opening having a width of 1100 mm, the trailing edges, of the paddle flight having the right hand thread and of the paddle flight having a left hand thread, are spaced apart a distance (D) of about 280 mm.

According to a ninth aspect of the invention there is provided a Front for attachment to a harvester a feeder house opening for delivery of the crop material into the harvester for separation thereof, the Front comprising a (1) a cutting bar for cutting the crop material, (2) a platform adapted to receive the crop material cut by the cutting bar and (3) delivery means for moving the crop material towards the centre of the platform, (4) a reel including a teeth assembly for picking up the cut crop material and letting the crop material fall onto the auger by rotating the reel, and (5) a feeder device located adjacent the delivery means for receiving the crop material and forefront the feeder house opening for delivery of the crop material into the harvester during rotation of the feeder device, wherein the feeder device comprises a feeder device as described in any one of the sixth and eighth aspects of the invention.

Preferably, the delivery means comprise either conveyor assembly or auger means.

Preferably, in the arrangement where the delivery means comprise auger means the feeder device as described in any one of the sixth and eighth aspects of the invention is incorporated in the centre section of an auger of an auger front.

According to a tenth aspect of the invention there is provided a harvester comprising a front in accordance with the ninth aspect of the invention.

According to a eleventh aspect of the invention there is provided an auger of an auger front, the auger having a first end comprising a first flighting, a second end comprising a second flighting, and a centre section comprising a feeder device as described in any one of the sixth and eight aspects of the invention.

Preferably, the feeder device in accordance with any one the previous aspect comprises a feeder drum.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 8 shows a table providing numerical values to the particular dimensions defined in FIG. 7 for different type of models of harvester fronts;

DESCRIPTION OF EMBODIMENT(S)

One embodiment of the invention relates to a feeder device such as a feeder drum 26 for attachment to a harvester front 12 for gathering crop material for introducing in a feeder house opening of the harvester 10 onto which the harvester front 12 is attached.

FIGS. 2 to 6 show a particular arrangement of a feeder drum 26 in accordance with the present embodiment of the invention. The feeder drum 26 shown in FIGS. 2 to 6 is incorporated in a draper front. However, alternative arrangement of feeder drums 26 in accordance with the present embodiment of the invention may be incorporated in other Fronts such as auger fronts.

In the particular arrangement, where the feeder drum 26 in accordance with the present embodiment of the invention is incorporated in an auger front, the auger of the auger front has flighting extending from the ends of the auger to a centre section comprising the feeder drum 26.

The feeder drum 26 in accordance with the present embodiment of the invention has a first end 33*a* with a first flighting (such as 32*a*)), a second end 33*b* with another first flighting (such as 32*d*), and a centre section with a second flighting (such as 32*b* and 32*c*). The first flighting 32*a* has a right hand thread; the another first flighting 32*d* has a left hand thread.

The second flighting 32*b* has a right hand thread and; and the second flighting 32*c* has a left hand thread;

The first end 33*a* when viewing the rear of the feeder drum 26 is the left hand end. The second end 33*b* when viewing the rear of the feeder drum 26 is the right hand end.

The feeder drum 26 is for use in a harvester front for cutting and collecting crop material, the front including a rear opening arranged such that cut crop material is transferred therethrough into a feeder house opening of the harvester.

Figure 1:
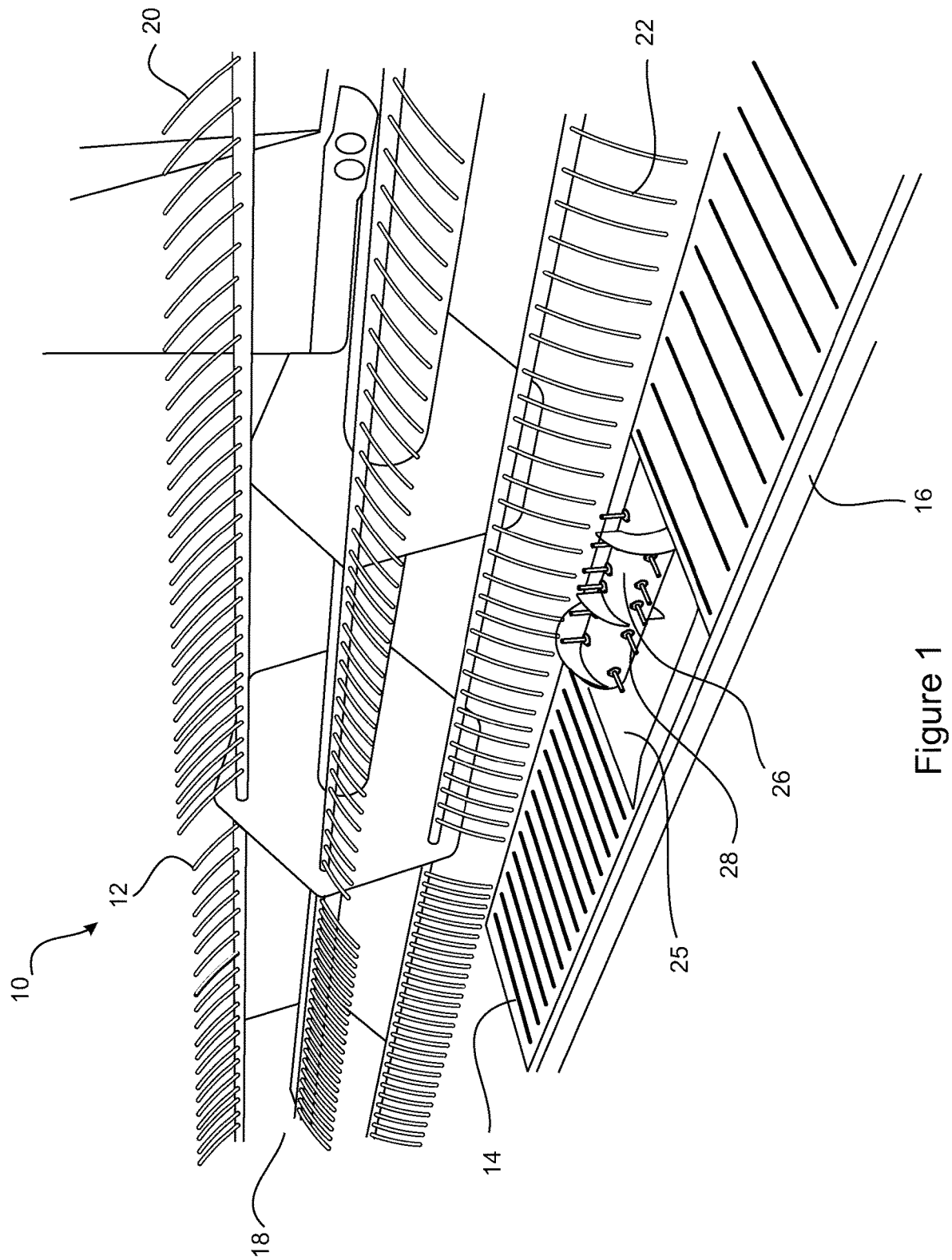
FIG. 1 is a side perspective view of a conventional harvester draper front.
Figure 2:
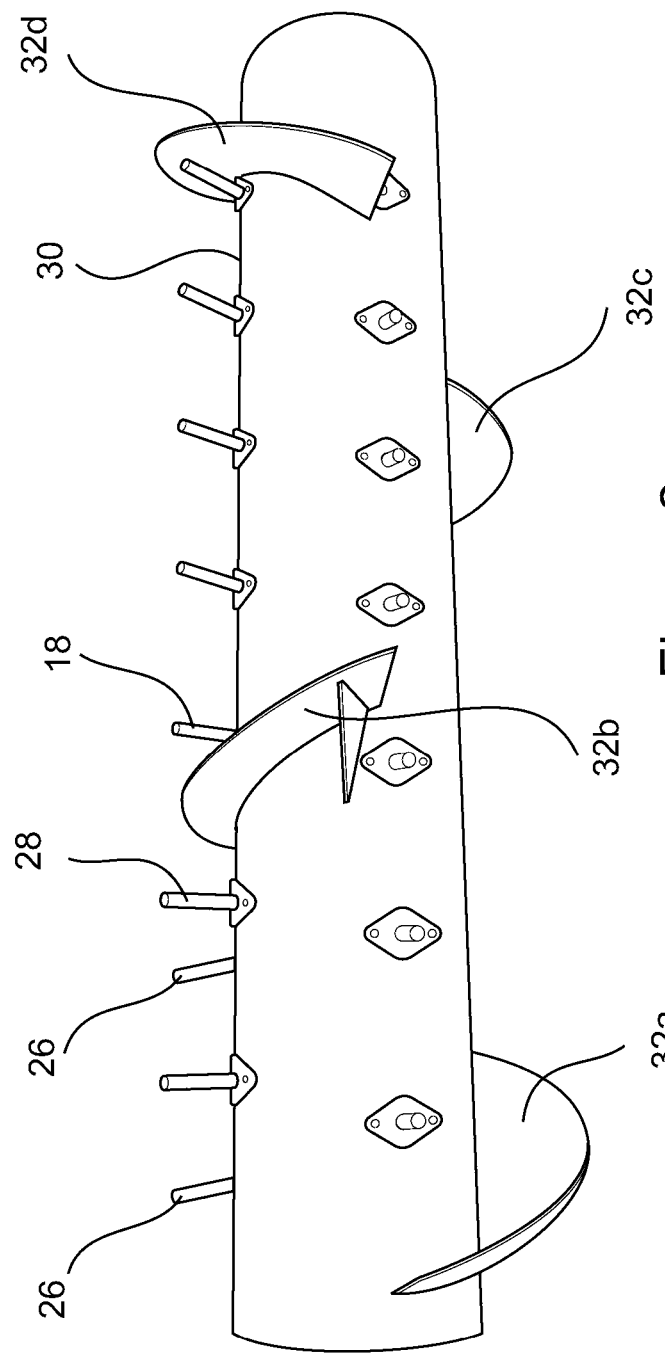
FIG. 2 is a rear side perspective view of a particular arrangement of a feeder device in accordance with an embodiment of the invention incorporated in the harvesting front shown in FIG. 1.

FIG. 2 shows a particular arrangement of a feeder drum 26 in accordance with the present embodiment of the invention. The feeder drum 26 is located at the centre section 24 of the Front 12 and adjacent the feeder house opening through which the crop material is moved through for processing within the harvester 10.

Figure 7:
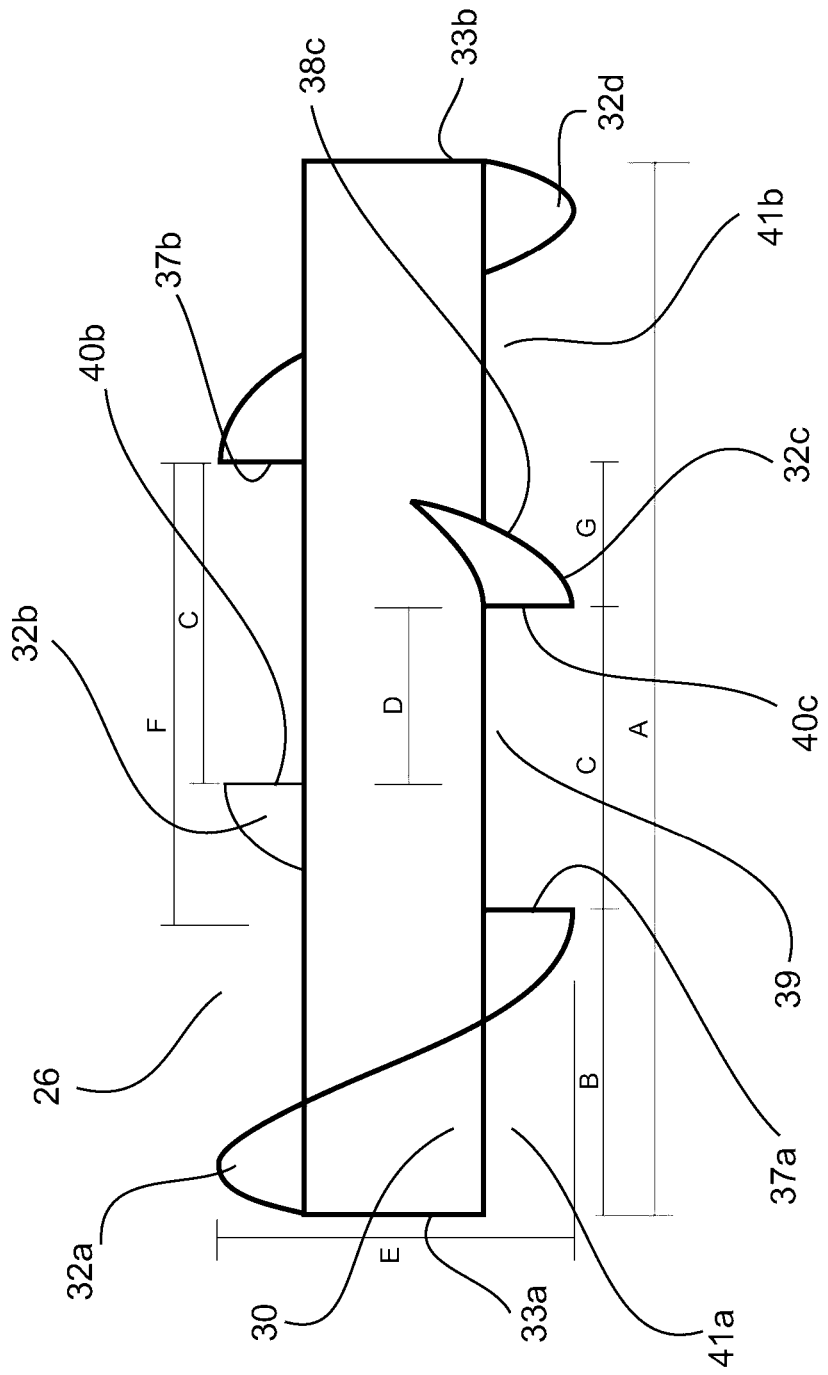
FIG. 7 shows a rear perspective sketch of a particular arrangement of the feeder device in accordance with an embodiment of the invention defining dimensions for particular features of the feeder device.
Figure 9:
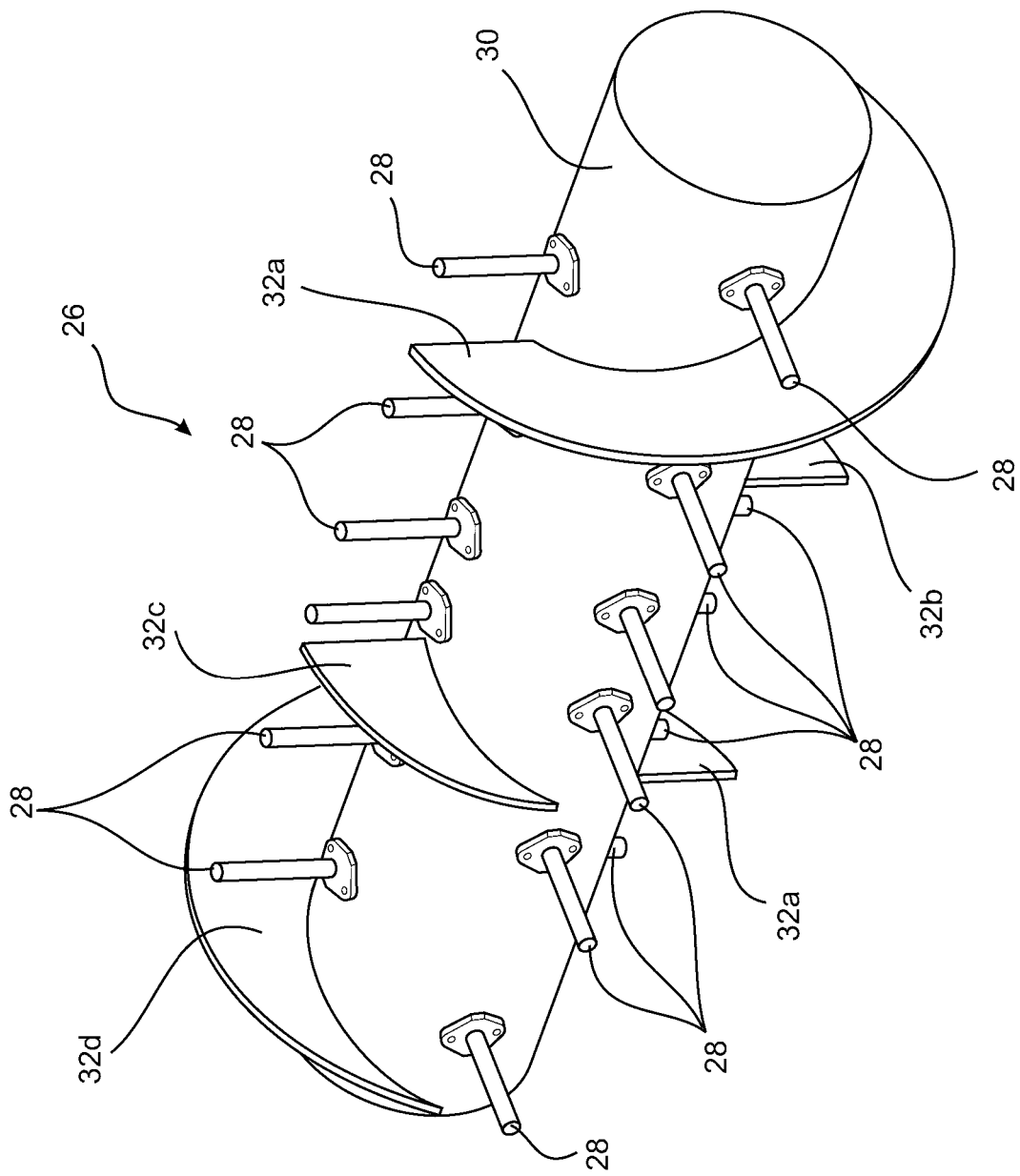
FIG. 9 is a schematic front perspective side view of the particular arrangement of the feeder device shown in FIG. 2.
Figure 10:
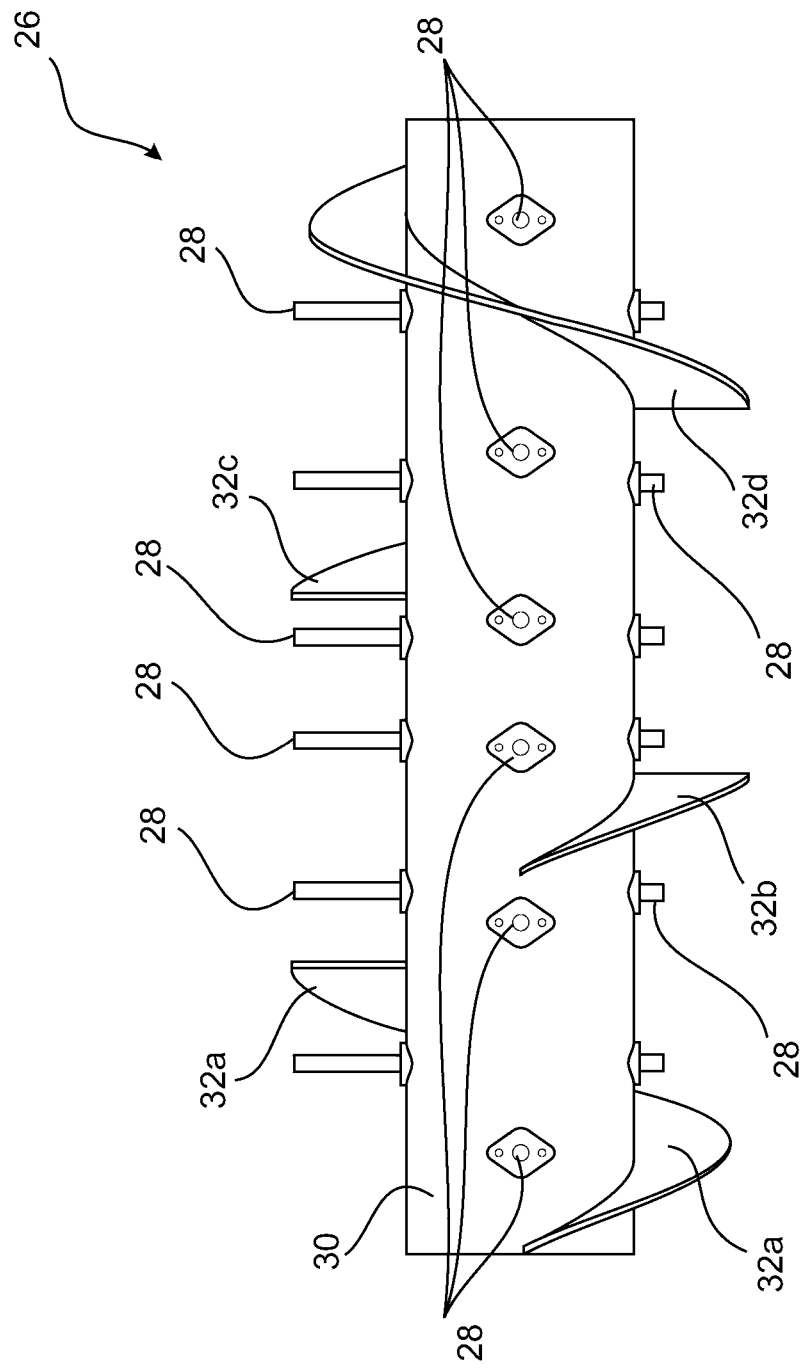
FIG. 10 is a schematic rear perspective view of the particular arrangement of the feeder device shown in FIG. 2.

The feeder drum 26 comprises a shaft 30 which is mountable in the harvester front 12 so as to be rotatable about a central axis thereof and has opposed end sections 41 and a centre section 39 located between the end sections 41*a* and 41*b* as shown in FIG. 7. The shaft 30 is dimensioned such that the centre section 39 is arranged in front of the feeder house opening when the shaft 30 is mounted on the front 12. In an arrangement, the end sections 41 each have a length between a quarter and a half of a length of the centre section 39.

The feeder drum 26 is adapted to rotate during operation of the harvester 10 for delivering of the crop material through the feeder house opening of the harvester 10. Rotation of the feeder drum 26 permits moving the crop material that is delivered to the feeder drum 26 by delivery means, such as a centre draper mat, into the feeder house opening for delivery of the crop material into the harvester 10. Also, rotation of the feeder drum 26 permits movement (between an extended condition and a retracted condition) of fingers 28 that assist in the action of collecting and moving the crop material through the feeder house opening of the harvester 10. As will be described at a later stage the feeder drum 26 comprises a plurality of retractable fingers 28 for engaging and moving crop material through the feeder house opening of the harvester 10.

The feeder drum 26 comprises one or more conveyor means configured for improving operation of the feeder drum 26. In fact, as will be described in greater detail below, a particular arrangement of the feeder drum 26 in accordance with the present embodiment of the invention is configured to improve feeding of crop material into the feeder house opening; in particular, the conveyor means are configured and arranged on the shaft 30 of the feeder drum 26 to direct the crop material into the feeder house opening.

In the particular arrangement of feeder drum 26 shown in the figures, the conveyor means comprise flights 32; however, in alternative arrangements, other conveyor means may be used.

For example, the feeder drum 26 may comprise one or more paddles projecting from the centre section 39 and diagonally to the central axis so as to urge crop material lying below the centre section 39 towards said opening as the shaft rotates.

In the particular arrangement shown in the figures, the feeder drum 26 comprises one or more paddles 32*b* and 32*c*. The paddles 32*b* and 32*c* being arranged at spaced positions on the shaft 30 and being located distal of the first and second ends 33 of the feeder drum 26.

In an arrangement, the paddles 32*b* and 32*c* wrap up to one third or one quarter of a turn around the shaft.

Each paddle is configured to conform to an imaginary helix extending from the first end 33*a* to the second end 33*b* of the shaft 30 defining paddle flights 32*b* and 32*c*.

In the particular arrangement shown in the figures the imaginary helix has a pitch of about 600 mm. In a further arrangement, paddle is shaped such that the pitch is between three times the diameter of the shaft. In another arrangement, paddle is shaped such that the pitch is between one times the diameter of the shaft.

Further, the paddles 32*b* and 32*c* are arranged to either side of a plane which is perpendicular to the central axis of the front 12 and, when the shaft 30 is mounted on the front 12, the plane passes substantially centrally through the feeder house opening of the harvester 10, such that surfaces of the paddles 32*b* and 32*c* face in directions which intersect with said plane. The paddles 32*b* and 32*c* are arranged to contact the crop material lying below the centre section of the shaft 30, so as to urge the crop material towards said feeder house opening.

In the arrangement shown in the figures, the paddles are angularly offset around the shaft where an offset angle of the paddles is 360 degrees divided by the number of paddles, whereby the angular offset of the paddles is regular.

Further, the feeder drum 26 in accordance with the present embodiment of the invention may be configured for use with different type of harvesters. In particular, the dimensions of particular features (shown in FIG. 7) of the feeder drum 26 may be adjusted in such a manner that the feeder drum 26 may operate in conjunction with different type of harvesters.

FIG. 7 is a schematic drawing of a particular arrangement of the feeder drum 26 in accordance with the present embodiment of the invention. In FIG. 7 are labeled (using letters A through F) the dimensions of the particular features of the feeder drum 26 to be adjusted to permit the feeder drum 26 to operate with different type of harvester fronts. FIG. 8 shows the numerical values of the dimensions of these particular features for different types of harvester fronts.

Configuring the feeder drum 26 so as to include the particular features shown in FIG. 7 having dimensions shown in FIG. 8 of the feeder drum 26 permits operating of the feeder drum 26 with the harvester fronts 12 mentioned in FIG. 8. In accordance with alternative arrangements, other feeder drums 26 that include the particular features shown in FIG. 7 with the particular features having dimensions that differ from the dimensions mentioned in FIG. 8 may be configured for installation of other type of harvesters and harvester fronts not listed in FIG. 8.

Referring now to FIGS. 2 to 5, FIGS. 2 to 5 shows a particular arrangement of the feeder drum 26 in accordance with the present embodiment of the invention.

The feeder drum 26 comprises a shaft 30 including a plurality of flights 32. The flights 32 extend substantially along the entire length of the shaft 30 and are arranged in a spaced apart relationship with respect to each other.

In the particular arrangement shown in FIGS. 2 to 6, the plurality of flights 32 comprise (1) first flights 32a and 32d and (2) second flights 32c and 32b. In the particular arrangement shown in the FIGS. 2 to 5 there are four flights 32a to 32d. The pair of flights 32a and 32b having right hand threads; the pair of flights 32c and 32d having left hand threads.

The flight 32a comprises a curved proximal end 35a adjacent the first end 33a of the shaft 30—see FIG. 2. The flight 32d comprises a curved proximal end 35d adjacent the second end 33b of the shaft 30—see FIG. 3.

Figure 3:
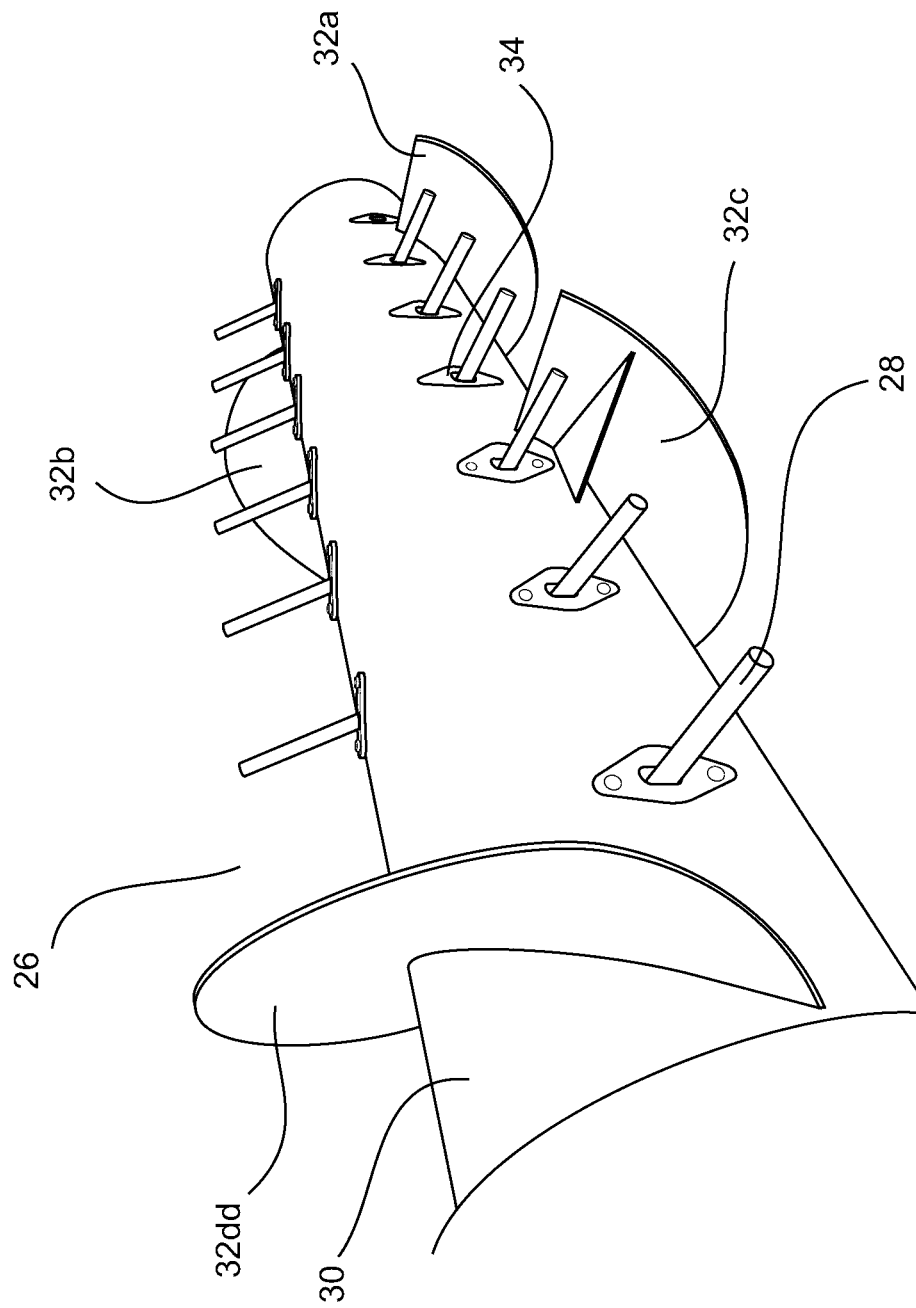
FIG. 3 is a front side perspective view of the feeder device shown in FIG. 2.

Further, the flight 32a comprises a distal end 37a spaced apart from the first end 33a—see FIG. 3. The flight 32d comprises a distal end 37b spaced apart from the second end 33b—see FIG. 3.

The flights 32a and 32d define flighting wrapping around the end sections 41a and 41b of the shaft 30. The flighting on each end section 41 extends substantially throughout the entire length of that end section. The flight 32a on the first end section 41a is offset from the flight 32d on the second end section 41b by half a turn around the shaft 30.

These first and second flights 32 are at least partially wrapped around the shaft 30 such that the flights 32 do not complete one full turn of 360° around the shaft 30; but instead, the flights 32 wrap around the shaft 30 at azimuth angles around the longitudinal axis of the shaft 30 less than 360°.

In particular, one pair of flights 32a and 32d wrap around the shaft 30 a particular azimuth angle α of about 180° such that the flights 32a and 32d wrap about a half (½) of one turn around the shaft 30.

In an alternative arrangement, the first and second flights on each end section 41 wraps up to one turn around the shaft.

Another pair of flights 32b and 32c wrap around the shaft 30 about a particular angle β of about 120° such that the flights 32b and 32c wrap about one third (⅓) of a turn of the shaft 30.

In an alternative arrangement, the pair of flights 32b and 32c on the centre section 39 wraps up to or about a quarter of a turn around the shaft.

Further, as can be appreciated from FIGS. 2 to 5, the flights 32a to 32d partially surround the shaft 30; this can be appreciated when comparing the rear views (FIGS. 2 and 6) of the feeder drum 26 against the front views (FIGS. 3 to 5) of the feeder drum 36. In fact, the flights 32a and 32c shown in FIG. 2 surround the shaft 30 of the feeder drum 26 from a particular location shown in FIG. 2 and end at another particular location, shown in FIG. 3, that is offset an angle of less than 360° with respect to the particular location shown in FIG. 2.

Similarly, the flights 32b and 32d shown in FIG. 3 wrap the shaft 30 of the feeder drum 26 from a particular location shown in FIG. 3 and end at another particular location, shown in FIG. 2, that is offset an angle of less than 360 degrees with respect to the particular location shown in FIG. 3.

In the particular arrangement shown in the FIGS. 2 to 6, the flight 32a wraps a particular angle $\alpha_a$ around the shaft 30 and flight 32b extends a particular angle $\alpha_b$ around the shaft 30—the angle $\alpha_b$ being smaller than the angle $\alpha_a$. Similarly, flight 32d extends a particular angle $\alpha_d$ around the shaft 30 and flight 32c extends a particular angle $\alpha_c$ around the shaft 30—the angle $\alpha_c$ being smaller than the angle $\alpha_d$.

In a particular arrangement, the values of the angles $\alpha_b$ and $\alpha_c$ are about ⅓ of a wrap and the values of the angles $\alpha_a$ and $\alpha_d$ are about ½ of a wrap.

In particular, the values of these angles are:
$\alpha_a$=180 degrees
$\alpha_b$=120 degrees
$\alpha_c$=120 degrees
$\alpha_d$=180 degrees In accordance with alternative arrangements, any of the angles $\alpha_a$ to $\alpha_d$ may have different values than the ones listed above.

Moreover, in the particular arrangement shown in the figures, the second flights 32b and 32c on shaft 30 comprise flights configured in the form of a fin having a beveled-like leading edge 38 and a square cut trailing edge 40. These particular type of flights 32b and 32c are referred herein as paddle flights 32b and 32c. The inclusion of the paddle flights 32b and 32c in the feeder drum 26 is particularly useful because the paddles 32b and 32c are adapted to engage and move the crop material from the floor located below the feeder drum 26 into the feeder house opening.

Figure 4:
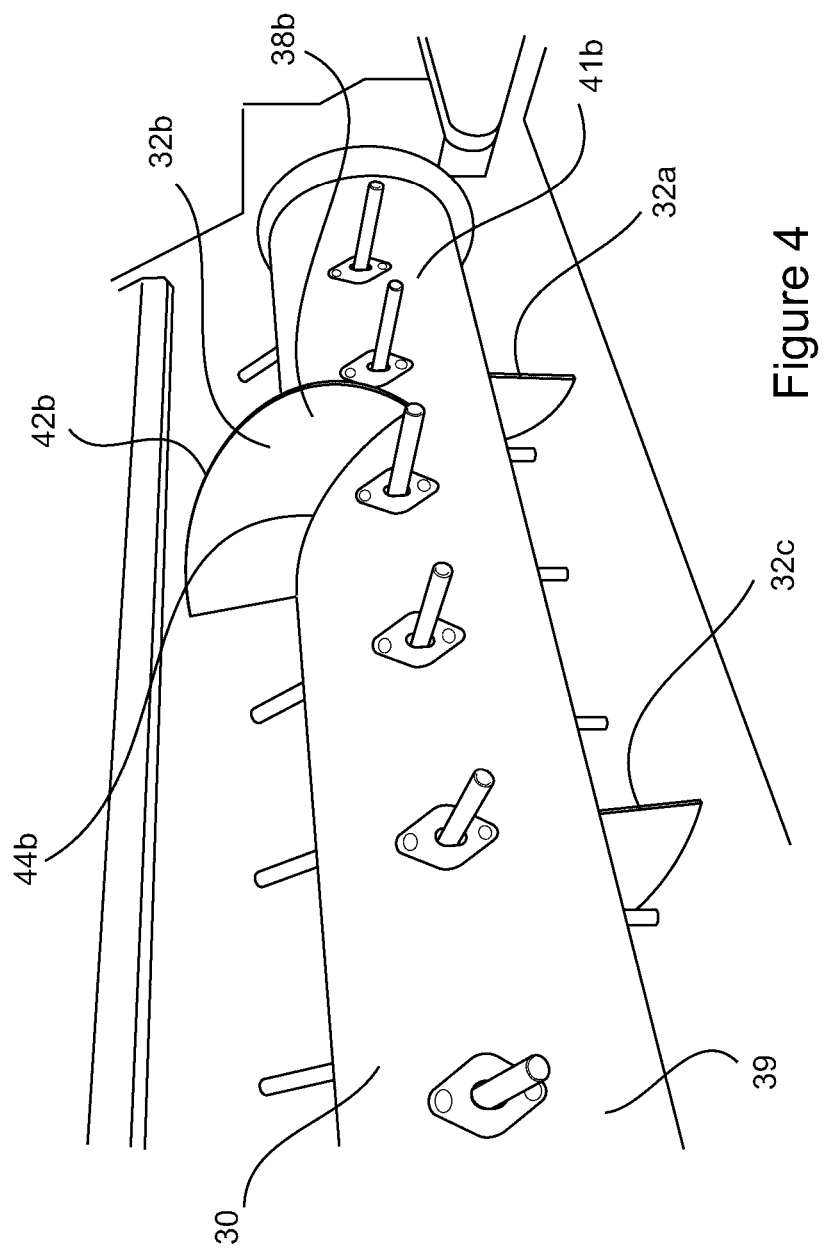
FIG. 4 is a front side perspective view of an end section of the feeder device shown in FIG. 3.
Figure 5:
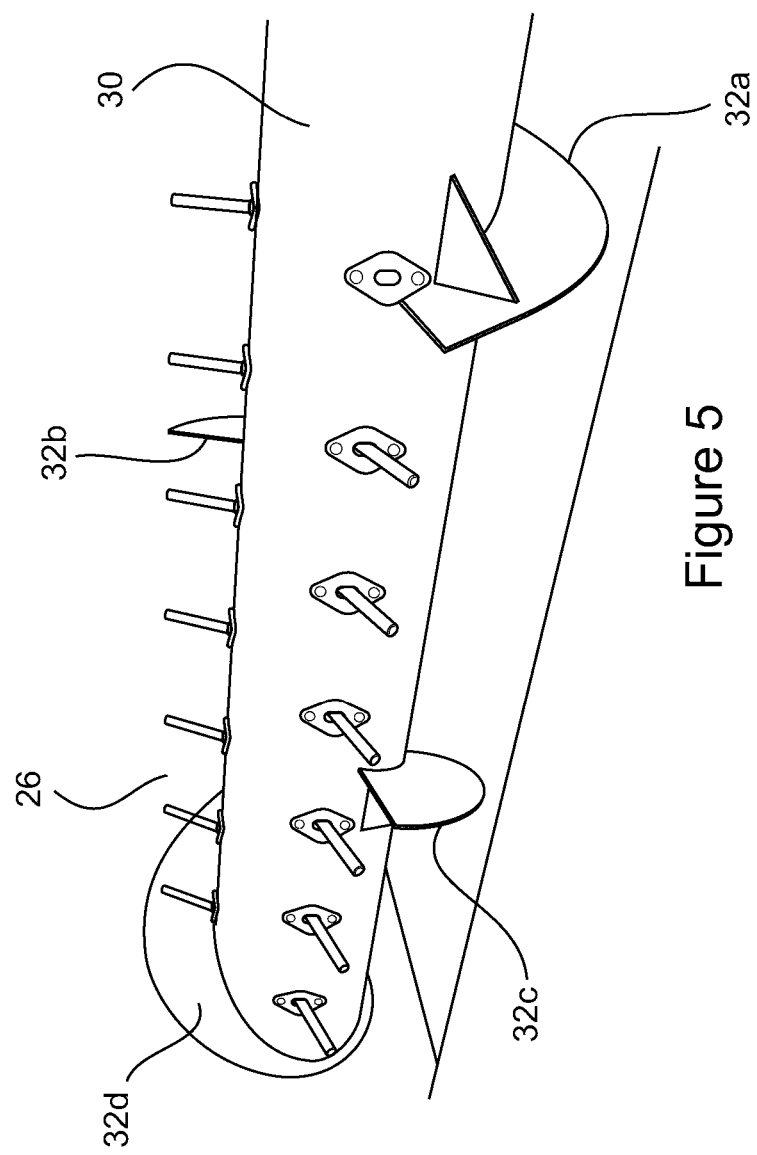
FIG. 5 is a front side perspective view of the opposite end section with respect to the end section (shown in FIG. 4) of the feeder device shown in FIG. 2.

The leading and trailing edges 38 and 40 of both paddle flights 32b and 32c are substantially identical with respect to each other. FIG. 4, shows the leading edge 38b and the trailing edge 40b of the paddle flight 32b and the trailing edge 40c of the paddle flight 32c. The leading edge 38c of the paddle flight 32c, being also a beveled-like leading edge, as can be seen in FIG. 7.

In accordance with this particular arrangement of paddle flights 32b and 32c, the leading edge 38 of each paddle flight 32b and 32c defines a curved edge defined by the outer edge 42 (the outer edge 42 being the edge that is opposite to the edge 44 that is attached to the outer surface of the shaft 30) with the height (referred to as the flight depth) of the curved edge of the paddle flights 32b and 32c decreasing to zero as the paddle flight 32 partially wraps around the shaft 30 as shown in FIG. 4 or 7. In the particular arrangement shown in the figures, the curved edge has a particular curvature radius being about 85% of the height (i.e. the flight depth) of the trailing edge 40. In a particular arrangement, the flight depth is 130 mm and the curvature radius is about 110 mm.

Further, as mentioned before, the paddle flights 32b and 32c comprise square cut trailing edges 40 that define an end edge extending perpendicularly to the outer surface of the shaft 30 and have a height equal to the maximum flight depth of the paddle flights 32—see FIG. 4.

In a particular arrangement, the leading edge of the or each paddle has a radius of curvature, about a position on the shaft from which a trailing edge of the paddle extends, which is between half of a maximum dimension the paddle in a direction radially outward from the shaft ("depth") and about 190 mm or more.

Furthermore. In the particular arrangement shown in the figures, the trailing edges 40b are offset 180° as can be appreciated in FIG. 4 or 7. In other words: the trailing edges 40b and 40c are spaced apart an azimuth angle of 180° around the axis of the shaft 30 with respect to each other.

It is particularly advantageous, to use paddles flights 32b and 32c having curved leading edges as described above because the presence of the curved edges prevents catching crop material on the outer edges 42 of the paddle flights 32b and 32c (in particular, the leading edges of the paddle flights 32b and 32c) during rotation of the shaft 30. Thus, the inclusion of paddle flights 32b and 32c increases engagement and movement of crop material into the feeder house opening thus preventing the build-up of crop material that rests in a substantial stationary condition under the centre of the feeder drum 26.

The amount that the first flights 32a and 32d extend along the shaft 30 from the ends of the feeder drum 26 is related to the width of the feeder house opening of the particular harvester 10 with which the feeder drum 26 will be operating.

In particular, the first flights 32a and 32d extend away from the outer ends 33 of the shaft 30 with their distal ends 37a and 37d located adjacent the outer edges of the feeder house opening in order for the distance (F as defined in FIG. 7) between the distal ends 37a and 37d of the first flights to be substantially the same or slightly narrower than the width of the feeder house opening. In a particular arrangement, the difference between the distance F and the width of the feeder house opening is about 100 mm.

The value of the angles $\alpha_a$, and $\alpha_d$ are less than 360° ensuring that a coarse flighting surrounds each end of the shaft 30. This is in contrast with conventional feeder drums comprising closely packed flights due to the fact that the flighting fully wraps around the ends of the shaft 30 several times.

Each flights 32a and 32d is configured to conform to a particular imaginary helix extending from the first end 33a to the second 33b of the shaft 30. This imaginary helix defines a coarse flighting. In the particular arrangement shown in the figures the imaginary helix has a pitch of about two times the diameter of the shaft.

A coarse flighting is one that has a relative large pitch—the pitch being the distance between adjacent crests of a flight that wraps a full turn or more around a shaft. As mentioned above, in conventional feeder drums the flighting wraps around the drum of the conventional feeder drums more than a full turn around the drum; thus, the pitch of the flighting in conventional feeder drum 26 is relative small.

In contrast, in accordance with the particular arrangement of the present embodiment of the invention shown in the figures, the first flights 32a and 32d would have a relative large pitch if the first flights 32a and 32b would wrap a full turn around the shaft 30.

It is particularly advantageous, that the pitch of the imaginary helixes (to which each of the first flights 32a and 32b are configured and that extends from the first end 33a to the second 33b of the shaft 30) is relatively large.

This is because the force applied to the crop material in flighting having a relatively large pitch (flights 32a and 32b) has an equal or greater component that is tangential to the rotation of the flighting, thereby increasing the effect of pushing the crop material rearwards into the feeder house opening as compared to flighting having a relatively narrow pitch.

Further, the distance that the first flights 32a and 32d extend from the outer ends of the shaft 30 may vary depending on the particular harvester 10 and harvester front (12) with which the feeder drum 26 will be operating—this distance is labeled as B in FIG. 7 and is given particular numerical values in FIG. 8 for particular harvester fronts 12 when fitted to a harvester with a feeder house opening width of 1100 mm.

As indicated in FIG. 8, the particular distance (B) that the first flights 32a and 32d extend inward from the outer ends of the shaft 30 of the feeder drum 26 is half the difference between the shaft length (A) and the distance (F) between the distal ends of the first flights 32a and 32d.

And, the distance (F) between the distal ends of the first flights will be substantially the same or smaller than the width of the feeder house opening of the particular type of harvester 10.

Further, in the particular arrangement of feeder drum 26 shown in the FIGS. 2 to 6, the dimension B shown in FIG. 7 of the first flights 32a and 32d may have different numerical values depending on the particular type of harvester 10 and harvester front 12 onto which the feeder drum 26 will be installed. FIG. 8 shows particular numerical values for the distance B that feeder drums 26 should have so as to operate with different type of harvester fronts 12. When fitted to a harvester with a feeder house opening width of 1100 mm.

For the first flights 32a and 32d to extend the distance (B) and wrap less than a full turn around the shaft 30 for feeder drums 26 to be attached to harvesters 10 such as the ones mentioned in FIG. 8, the first flights 32a and 32d will have a relative coarse flighting resulting, as mentioned before, due to the fact that the pitch (if the first flights 32a and 32d would be wrapping a full turn around the shaft 30) is relative large.

Further, it was mentioned before that the first flights 32 are adapted to direct the crop material into the feeder house opening of the harvester 10; for this the configuration of the flights 32 as well as the particular arrangement of the flights 32 are such that the flights direct the crop material into the feeder house opening.

In particular, in one arrangement, the trailing edge of the paddle flights 12b and 12c are spaced apart a distance (D) for a feeder drum 26 to be operated on a front attached to a harvester with a feeder house opening having a width of 1100 mm. FIG. 8 shows particular numerical values for the distance D for different types of harvester fronts when fitted to a harvester with a feeder house opening width of 1100 mm.

Furthermore, the distance (C) between the distal ends of the first flight 32a and 32d and of the paddle flights 32b and 32c will be such that the paddle flights 32b and 32c are forefront the feeder house opening permitting the paddle flights 32b and 32c to move the crop material into the feeder house opening.

In particular, for a feeder drum 26 to be operated in conjunction with the harvester 10 mentioned in FIG. 8 and which all have a feeder house opening having a width of 1100 mm, the distance (C) between the distal end 37 of the first flight having a right hand thread and of the paddle flight having a left hand thread is about 640 mm.

And, for a feeder drum to be operated in conjunction with a harvester with a feeder house opening having a width of 1100 mm, the distance (C) between the distal ends 37 of the first flight having a left hand thread and of the paddle flight having a right hand thread is about 640 mm.

Furthermore, the distance (G) between the distal end 37 of the first flights 32a and 32d and of the paddle flights 32b and 32c will be such that the paddle flights 32b and 32c are forefront the feeder house opening permitting the paddle flights 32b and 32c to move the crop material into the feeder house opening.

And, for a feeder drum 26 to be operated in conjunction with a harvester with a feeder house opening having a width of 1100 mm, the distance (G) between the distal end 37d of the first flight having a right hand thread and of the paddle flight having a right hand thread is about 360 mm.

Further, for a feeder drum 26 to be operated in conjunction with a harvester with a feeder house opening having a width of 1100 mm, the distance (G) between the distal end 37a of the first flight having a left hand thread and the paddle flight having a left hand thread is about 360 mm.

Moreover, in accordance with the present embodiment of the invention, the diameter of the feeder drum 26 comprises an overall diameter (dimension E shown in FIG. 7) as defined by the diameter of the shaft 30 plus the flight depth of the flights 32 of the feeder drum 26. The flight depth is defined as the distance between the outer surface of the shaft 30 and the external edge of the flights 32. In the particular arrangement of the feeder drum 26 shown in the FIGS. 2 to 6, the diameter of the shaft 30 is about 300 mm and the flight depth (also referred as the strip width) is about 130 mm. Thus, the ratio between the overall diameter of the feeder drum 26 (being the diameter of the shaft 30 plus the flight depth) and the diameter of the shaft 30 is about 1.87—i.e. ((560)/(560-260). As shown in FIG. 8, this particular arrangement of feeder drum 26 may be used to operate in conjunction with McDon D60/D65, McDon Older models, and Honeybee models of harvester fronts.

In accordance with alternative arrangements, the diameter of the shaft 30 and the flight depth of feeder drums 26 may have different values than the ones mentioned above; thus the ratio between the overall diameter of the feeder drum 26 and the diameter of the shaft 30 will be different. For example, as shown in FIG. 8 for a harvester front of the type Case New Holland, the overall diameter of the feeder drum 26 is 650 mm and the flight depth is about 130 mm. Thus, the ratio between the overall diameter of the feeder drum 26 and the diameter of the shaft 30 is 1.67—i.e. ((650)/(650-260).

Further, the diameter of the shaft 30 is about 300 mm and the flight depth of the flights is about 130 mm. Thus, the ratio between the diameter of the shaft and the flight depth is about 2.3. In accordance with alternative arrangements, the shaft diameter and the flight depth may have different values than the ones mentioned above; thus the ratio between the shaft diameter and the flight depth will be different; for example, for a harvester of the type CNH, the ratio should be 3.

In accordance with the present embodiment of the invention, the overall diameter E of the feeder drum 26 is configured depending on the particular type of harvester front onto which the feeder drum 26 will be installed. FIG. 8 shows the particular values of overall diameters E of feeder drums 26 to be attached to different types of harvester fronts.

In a particular arrangement of the present embodiment of the invention, the flight depth will be adjusted depending on the specific diameter that a shaft 30 of the feeder drum 26 needs to have in order to operate on a particular front attached to a particular harvester 10.

The feeder drum 26 shown in the figures has an overall diameter (referred herein as 'overall diameter' of the feeder drum 26) of about 560 mm. This particular arrangement of feeder drum 26 is particularly appropriate for installation onto D60/D65 models and other models for the harvester fronts branded as McDon as well as for some models of Harvester fronts branded as Honeybee.

In contrast, the feeder drum 26 in accordance with the present embodiment of the invention for use in conjunction with Case New Holland harvester fronts should have an overall diameter of 650 mm Further, in particular arrangements, the feeder drum 26 in accordance with the present embodiment of the invention comprises a shaft 30 that has a smaller diameter and taller flighting and greater finger extension (when the retractable fingers 28 are in the extended condition) when compared to conventional feeder drums. These particular arrangements of the present embodiments of the invention are more effective in engaging and moving the crop material when compared with conventional feeder drums; this is particularly true due to the longer "effective" length of the retractable fingers 28 allowing the fingers 28 to engage the crop material and moving the crop material for delivery into the feeder house opening.

A second benefit of a shaft 30 having a smaller diameter and larger flight depth of the flights 32 is that there is a taller gap (when compared to conventional feeder drums) between the shaft 30 of the feeder drum 26 and the floor below the feeder drum 26, thereby allowing more crop material to flow unimpeded through to the feeder house opening.

It is important to note that in conventional feeder drums, the ratio between the overall diameter of the feeder drum 26 and the diameter of the shaft 30 is 1.57—i.e. ((550)/(-350). In contrast, as mentioned above feeder drums 26 in accordance with particular arrangements of the present embodiment of the invention ratio is 1.67 to 1.87 as shown in FIG. 8.

Further, in conventional feeder drums, the ratio between the shaft diameter and the flight depth is about 3.5 (for example, 350 mm/100 mm). In contrast, as mentioned above feeder drums 26 in accordance with particular arrangements of the present embodiment of the invention ratio is 2.3 to 3.

The fact that the ratio between the diameter of the shaft 30 and the flight depth in accordance with particular arrangements of the present embodiment of the invention are relatively lower is particularly advantageous because (1) the fingers 28, as mentioned before, due to having a longer effective length are being able to engage and move the crop material more effectively than the fingers of conventional feeder drums, and (2) the gap under the feeder drum 26 has a relative larger depth facilitating the flow of crop material from the floor under the feeder drum 26 to the feeder house opening.

Moreover, it was indicated before that the feeder drum 26 comprises fingers 28 that assist in the action of collecting and moving the crop material into the feeder house opening of the harvester 10.

Figure 6:
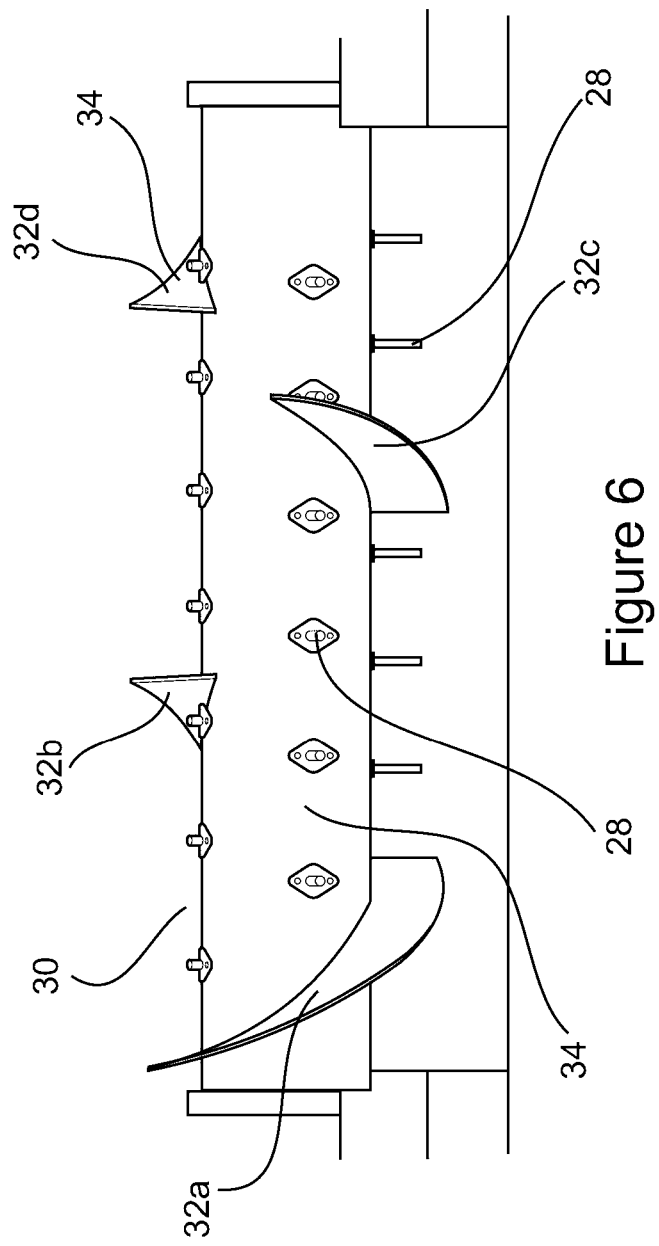
FIG. 6 is a rear perspective view of the particular arrangement of the feeder device shown in FIG. 2 in operation incorporated in the harvesting front shown in FIG. 1.

As shown in, for example, FIG. 6, in accordance with the present embodiment of the invention, the feeder drum 26 comprises one or more rows 34 of retractable fingers 28. The numbers of rows 24 that a particular feeder drum 26 may have, depends on factors such as the rotational speed of the feeder drum 26 during operation of the feeder drum 26, and the desired finger spacing within each row.

In the particular arrangement of the feeder drum 26 shown in the figures, the feeder drum 26 comprises a plurality of rows 34 of fingers 28—in particular there are four rows 34. The rows 34 are arranged in a spaced apart relationship with respect to each other and surrounding the shaft 30 of the feeder drum 26. Neighbouring rows of fingers 34 are spaced apart from each other at an azimuthal angle of 90 degrees around the shaft 30.

Furthermore, as shown in for example FIG. 6, the fingers of neighboring rows are offset with respect to each other along the length of the shaft 30. Further, each row 34 comprises a plurality of fingers 28 that are arranged in a spaced apart relationship with respect to each other and extend from between particular locations of the end sections 41 of the shaft 30.

The fact that the fingers 28 extend between particular locations of the ends 33 of the feeder drum 26 may result in that the rows 34 of the fingers 28 are intersected by the flights 32 as can be appreciated in, for example, FIG. 6.

In particular, each row 34 comprises a plurality of fingers 28 that are arranged in a straight line and each finger 28 being spaced apart from each other. It is particular advantageous that the fingers 28 of each row are arranged defining a straight line because each row of fingers 28 will not have effect in the circumstances where the fingers would be arranged in relationship such that the an auger would be defined by the particular arrangement of fingers; this ensures that the crop material is pulled instead of shifted sideways replicating the action of an auger as is the case in conventional feeder drums where the fingers are arrangement in an intermittent or auger-like relationship.

Further, the feeder drum 26 in accordance with particular embodiments of the invention also includes a relatively large number of fingers 28 when compared to conventional feeder drums.

In a particular arrangement, there are 25 fingers in the shaft 30. In particular, each rows of fingers 28 extends along a particular section of the shaft 30. This particular section has a length of about 1.3 meters with a finger density of about 20 fingers per meter and neighboring fingers in each row being spaced apart about 200 mm. In accordance with the present embodiment of the invention, the finger density will not vary depending on the length that each row of fingers 28 may have.

The length of the particular sections having fingers 28 extending along the shaft 30 may vary. For example, in the particular arrangement shown in the FIGS. 2 to 6, the flights 32 intersect the rows 34 at particular locations as depicted in FIG. 6. Alternatively, the rows of fingers may extend from the first end 33a of the shaft 30 to the second end 33b of the shaft 30. In the particular arrangement where a plurality of flights 32 define a threaded-like formation around the feeder drum 26 by extending substantially along the entire length of the feeder drum 26, the flights 32 may intersect the rows 34 at more locations when compared to the arrangement of the feeder drum 26 shown in FIGS. 2 to 6. In a particular arrangement, the finger density (number of fingers/length) is of the order as mentioned in the previous paragraph: about 20 fingers per meter.

Furthermore, as mentioned before the fingers 28 are adapted to be selectively displaced between an extended condition and a retracted condition. Displacement of the fingers 28 occurs during rotation of the feeder drum 26; for this to occur, the feeder drum 26 comprises—within the shaft 30—a crank shaft mechanism. For this, the shaft 30 is a hollow shaft defining a barrel for containment of the crank shaft mechanism and the retractable fingers.

Crank shaft mechanisms for driving retractable fingers in feeder drums as well as their manner of operation are known to any persons skilled in the art. Any suitable crank shaft mechanism may be incorporated in the feeder drum 26 in accordance with the present embodiment of the invention.

Broadly speaking, in particular crank shaft mechanisms, the fingers 28 are rotatably journaled by cylindrical bearings to a finger shaft. The finger shaft is eccentrically disposed within the shaft 30 and its ends connected via cranks arms to shafts rotatably attached to walls within the shaft 30. One of the shafts is operatively connected to a locking mechanism to prevent rotation of the finger shaft in relation to the frame to which the shaft 30 is attached.

Rotation of the feeder drum 26 must be synchronised with the operation of the crank shaft mechanism. Synchronisation is necessary to ensure that for varying climatic, field and crop conditions, the point of maximum extension and minimum extension of the fingers may be adjusted to suit those conditions. The process of adjustment of the crank shaft mechanism to synchronise the crank shaft with the rotation of the feeder drum 26 is known as 'timing of the crank shaft mechanism'.

The timing of the crank shaft mechanism may be done via any suitable timing mechanism known by the person skilled in the art. This is typically done via rotation of the crankshaft towards a particular angle wherein the crankshaft and the feeder drum 26 are synchronised to ensure that the fingers reach maximum extension at an optimal point of rotation in order to engage with the crop material in front of the feeder drum, and are fully retracted at a suitable point of rotation in order to release the crop material for delivery into the feeder house opening. Upon completion of synchronisation, the timing mechanism may be secured to impede rotation of the crank shaft and to keep the fingers 28 correctly timed.

In a particular arrangement, the timing mechanism is designed to permit rotation of the crankshaft to particular locations within a 360 degree range until the crank shaft mechanism is properly timed (i.e. synchronised with the rotation of the feeder drum 26);

Modifications and variations as would be apparent to a skilled addressee are deemed to be within the scope of the present invention.

Further, it should be appreciated that the scope of the invention is not limited to the scope of the embodiments disclosed. By way of example, in alternative arrangements of the present embodiment of the invention the screw flights 32 may extend any particular length ranging from 0 mm to the full width of the shaft 30, and the retractable fingers may also extend over any particular length ranging from 0 mm to the full length of the shaft 30. By way of example, in alternative arrangements of the present embodiment of the invention the feeder drum 26 may comprise a pair of screw flights 32 that fully surround the shaft 30 and that extend along the entire length of the shaft 30 and intersecting the rows of the fingers 28. In particular, this particular arrangement may incorporate a left hand screw flight 32 and a right hand screw flight 32; each of the screw flights extend from one end of the shaft 30 of the feeder drum 26 towards the centre of the shaft 30 defining a threaded formation along the shaft 30 of the feeder drum 26 adapted to convey the crop material towards the centre of the feeder drum 26. In this particular arrangement, the rows 34 of fingers 28 are intersected at a multitude of locations by the screw flights 32.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A feeder device, for use in a harvester draper header for cutting and collecting crop material, the header including a rear opening arranged such that crop material cut by the header is transferred therethrough so as to be delivered to a feeder house of the harvester, the feeder device comprising:
    a shaft which has a longitudinal axis and is mountable in the header so as to be rotatable about the longitudinal axis, the shaft having opposed end sections and a centre section located between the end sections, and being dimensioned such that when the shaft is mounted the feeder device is arranged at a central region of the header and the centre section is arranged in front of said opening;
    flighting on the end sections to direct crop material received into the header laterally inwardly towards a position below the centre section as the shaft rotates; and
    fingers, arranged in a spaced apart relationship, and at least one mechanism which is configured to reciprocate the fingers, as the shaft rotates, such that the fingers assume an extended condition during downward movement thereof, so as to be able to penetrate crop material received into the header to pull it under the shaft, and assume a retracted condition during rearward movement thereof, so as to separate from that material,
    whereby the material is moved towards the opening for delivery therethrough to the feeder house,
    the feeder device further comprising paddles projecting from the centre section and extending diagonal to the longitudinal axis such that surfaces thereof contact cut crop material that is on a floor of the header so as to urge it towards said opening as the shaft rotates, thereby preventing build-up of crop material on the floor, each paddle having a leading end which increases in depth in a direction along the paddle towards a trailing end of the paddle.

2. A feeder device according to claim 1, wherein the paddles are arranged at substantially equal angular intervals around the shaft.

3. A feeder device according to claim 1, wherein the fingers are arranged in one or more rows, the row or each row extending substantially parallel to the axis, and wherein said mechanism is configured to reciprocate the fingers such that the fingers in that row assume the extended condition during downward movement of the row and assume the retracted condition during rearward movement of the row.

4. A feeder device according to claim 1, wherein each paddle is shaped to conform to an imaginary helix extending around the shaft from one of the end sections to the other.

5. A feeder device according to claim 1, wherein the paddles comprise ones arranged to either side of a plane which is perpendicular to said axis and, when the shaft is mounted, passes substantially centrally through said opening, such that said surfaces face in directions which intersect with said plane.

6. A feeder device according to claim 1, wherein the flighting on each end section wraps up to one turn around the shaft.

7. A feeder device according to claim 1, wherein each paddle is shaped such that the imaginary helix to which it conforms has a pitch of up to three times a diameter of the shaft and not less than about one times a diameter of the shaft.

8. A feeder device according to claim 1, wherein said paddles are angularly offset around the shaft.

9. A feeder device according to claim 1, wherein the number of paddles is two.

10. A feeder device according to claim 1, wherein each paddle wraps up to one half of a turn around the shaft.

11. A feeder device according to claim 1, wherein the flighting on one end section is offset from the flighting on the other end section by half a turn around the shaft.

12. A feeder device according to claim 1, wherein the leading end of each paddle defines a leading edge which extends from a respective location on a surface of the shaft and which, with respect to the surface at that location, inclines whereby a degree of engagement between the paddle and crop material lying below the centre section increases progressively as the shaft rotates.

13. A feeder device according to claim 1, wherein the fingers in the row or each row are spaced apart by about 0.2m.

14. A feeder device according to claim 1, comprising plural said rows arranged at equally spaced positions around the shaft.

15. A feeder device according to claim 1, wherein the fingers are arranged such that there are about 20 fingers per metre along the shaft.

16. A feeder device according to claim 1, wherein the flighting on each end section wraps up to half a turn around the shaft.

17. A feeder device according to claim 1, wherein the flighting on each end section wraps about half a turn around the shaft.

18. A feeder device according to claim 1, wherein said paddles are equiangularly offset around the shaft.

19. A feeder device according to claim 1, wherein each paddle wraps up to one third of a turn around the shaft.

20. A feeder device according to claim 1, wherein each paddle wraps up to one quarter of a turn around the shaft.

21. A feeder device according to claim 1, wherein each paddle wraps about one quarter of a turn around the shaft.

22. A feeder device according to claim 1, wherein the paddles are defined by fighting.

23. A draper header comprising a feeder device in accordance with claim 1 and including a rear opening arranged such that crop material cut by the header is transferred therethrough so as to be delivered to a feeder house of the harvester, wherein the shaft is mounted so as to be rotatable about said longitudinal axis, such that the feeder device is arranged at a central region of the header and the centre section is arranged in front of said opening.

24. A feeder device according to claim 12, wherein each paddle has a smooth outer edge extending from the leading end thereof to a trailing end thereof, the smooth outer edge comprising the leading edge defined by said leading end.

25. A feeder device according to claim 12, wherein each leading edge is curved or convex.

26. A feeder drum, for use in a harvester draper header for cutting and collecting crop material, the header including a rear opening arranged such that crop material cut by the header is transferred therethrough so as to be delivered to a feeder house of the harvester, the feeder drum comprising:
 a shaft which has a longitudinal axis and is mountable in the header so as to be rotatable about the longitudinal axis, the shaft having opposed end sections and a centre section located between the end sections, and being dimensioned such that when it is mounted the feeder drum is arranged at a central region of the header and the centre section is arranged in front of said opening;
 flighting on the end sections to direct crop material received into the draper header laterally inwardly towards a position below the centre section as the shaft rotates;
 fingers mounted at distributed positions along and around the shaft; and
 at least one mechanism which is configured to reciprocate the fingers, as the shaft rotates, such that each finger assumes an extended condition during downward movement thereof, so as to be able to penetrate crop material received into the header to pull it under the shaft, and assumes a retracted condition during rearward movement thereof, so as to separate from that material,
 whereby the material is moved towards the opening for delivery therethrough to the feeder house,
 the feeder drum further comprising paddles projecting from the centre section and extending diagonal to the longitudinal axis, such that surfaces thereof contact cut crop material that is on a floor of the header so as to urge it towards said opening as the shaft rotates, thereby preventing build-up of crop material on the floor, each paddle having a leading end which increases in depth in a direction along the paddle towards a trailing end of the paddle.

27. A feeder drum according to claim 26, wherein each paddle is defined by a flight and a leading edge thereof is curved whereby a degree of engagement between the paddle and crop material in front of or below the centre section increases progressively as the shaft rotates.

28. A feeder drum according to claim 26, wherein the paddles are arranged to either side of a plane which is perpendicular to said axis and which, when the shaft is mounted in the header, passes substantially centrally through said opening.

29. A feeder drum according to claim 26, wherein the fingers are dimensioned such that each projects from the shaft a distance equal to at least a third of a diameter of the shaft when in its extended condition.

30. A draper header comprising a feeder drum in accordance with claim 26 and including a rear opening arranged such that crop material cut by the header is transferred therethrough so as to be delivered to a feeder house of the harvester, wherein the shaft is mounted so as to be rotatable about said longitudinal axis, such that the feeder device is arranged at a central region of the header and the centre section is arranged in front of said opening.

31. A feeder device according to claim 26, wherein the fingers are arranged in one or more rows, the row or each row extending substantially parallel to the axis, and wherein said mechanism is configured to reciprocate the fingers such that the fingers in that row assume the extended condition during downward movement of the row and assume the retracted condition during rearward movement of the row.

32. A feeder device according to claim 31, comprising plural said rows arranged at equally spaced positions around the shaft.

33. A feeder drum according to claim 26, wherein the leading end of each paddle defines a leading edge which extends from a respective location on a surface of the shaft and which, with respect to the surface at that location, inclines whereby a degree of engagement between the paddle and crop material increases progressively as the shaft rotates.

34. A feeder drum according to claim 33, wherein each paddle has a smooth outer edge extending from the leading end thereof to a trailing end thereof, the smooth outer edge comprising the leading edge defined by said leading end.

35. A feeder drum according to claim 33, wherein each leading edge is curved or convex.

36. A feeder drum for a draper header to be attached to a harvester, the feeder drum comprising:
 a rotatable drum dimensioned so as to be arranged at a central region of the header;
 flights extending along the length of said rotatable drum, the flights comprising:
  outer flights located adjacent ends of said rotatable drum to direct crop material received into the header laterally inwardly as the rotatable drum rotates; and
  inner flights, located between said outer flights; and
 fingers, arranged in a spaced apart relationship, and at least one mechanism to displace the fingers between extended and retracted conditions during rotation of the feeder drum, whereby the fingers are movable from the retracted condition to the extended condition to grab and pull the crop material for delivery through a rear opening in the header and into a feeder house of the harvester,
 wherein the inner flights comprise paddle flights for engaging crop material that is on a floor of the header and moving it through said rear opening for delivery to the feeder house, thereby preventing build-up of crop material on the floor, each paddle flight having a leading end which increases in depth in a direction along the paddle flight towards a trailing end of the paddle flight.

37. A feeder drum according to claim 36, wherein the flights extending along the length of the rotatable drum are arranged in a spaced apart relationship with respect to each other.

38. A draper header comprising a feeder drum in accordance with claim 36 and including a rear opening arranged such that crop material cut by the header is transferred therethrough so as to be delivered to a feeder house of the harvester, wherein the rotatable drum of the feeder drum is arranged at a central region of the header.

39. A feeder device according to claim 36, wherein the fingers are arranged in one or more rows, the row or each row extending substantially parallel to the axis, and wherein said mechanism is configured to reciprocate the fingers such that the fingers in that row assume the extended condition during downward movement of the row and assume the retracted condition during rearward movement of the row.

40. A feeder device according to claim 39, comprising plural said rows arranged at equally spaced positions around the rotatable drum.

41. A feeder drum according to claim 36 wherein the leading end of each paddle flight defines a leading edge which extends from a respective location on a surface of the rotatable drum and which, with respect to the surface at that location, inclines whereby a degree of engagement between the paddle flight and crop material increases progressively as the shaft rotates.

42. A feeder drum according to claim 41, wherein each paddle flight has a smooth outer edge extending from the leading end thereof to a trailing end thereof, the smooth outer edge comprising the leading edge defined by said leading end.

43. A feeder drum according to claim 41, wherein each leading edge is curved or convex.

\* \* \* \* \*